United States Patent
Kashihara et al.

(10) Patent No.: US 7,428,203 B2
(45) Date of Patent: Sep. 23, 2008

(54) SIGNAL EVALUATION METHOD, INFORMATION RECORDING/REPRODUCING APPARATUS, INFORMATION REPRODUCING APPARATUS, AND INFORMATION RECORDING MEDIUM

(75) Inventors: Yutaka Kashihara, Chigasaki (JP); Yuji Nagai, Kawasaki (JP); Shuichi Ookubo, Tokyo (JP); Masatsugu Ogawa, Tokyo (JP); Masaki Nakano, Tokyo (JP); Toshiaki Iwanaga, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 532 days.

(21) Appl. No.: 10/763,247

(22) Filed: Jan. 26, 2004

(65) Prior Publication Data

US 2004/0209293 A1    Oct. 21, 2004

(30) Foreign Application Priority Data

Jan. 28, 2003    (JP)    ............................. 2003-019396

(51) Int. Cl.
    *G11B 20/18* (2006.01)
(52) U.S. Cl. .............. 369/53.35; 369/53.31; 369/53.22; 714/100
(58) Field of Classification Search ........................ None
    See application file for complete search history.

(56) References Cited

U.S. PATENT DOCUMENTS 5,181,209 A * 1/1993 Hagenauer et al. .......... 714/795
7,139,231 B2 * 11/2006 Nagai et al. .............. 369/59.22
2003/0090980 A1 5/2003 Kashihara et al.
2005/0193318 A1 * 9/2005 Okumura et al. ............ 714/795

FOREIGN PATENT DOCUMENTS

| EP | 1 215 675 A1 | 6/2002 |
|---|---|---|
| EP | 1 262 971 A2 | 12/2002 |
| JP | 2002-38738 | 2/2002 |
| JP | 2003-272304 | 9/2003 |

* cited by examiner

*Primary Examiner*—Joseph Feild
*Assistant Examiner*—Parul Gupta
(74) *Attorney, Agent, or Firm*—Oblon, Spivak, McClelland, Maier & Neustadt, P.C.

(57) ABSTRACT

Reproduction signals include patterns for which recognition errors are likely. With respect to such patterns, probable error patterns are prepared. Tables showing correct patterns and error patterns are prepared, and evaluation values accurately representing signal quality are calculated. In an apparatus using a PRML method, discrimination data and a plurality of predetermined bit sequence pairs are examined to detect matching. A bit sequence and corresponding two ideal responses are calculated. Euclidean distances between the two ideal responses and equalization signals are obtained, and the difference between the Euclidean distances is further obtained. A quality evaluation value of a reproduction signal is calculated based on a mean value, a standard deviation, an appearance probability of the predetermined bit sequence, and a Hamming distance between the predetermined bit sequence pairs.

16 Claims, 9 Drawing Sheets

SIGNAL EVALUATION METHOD, INFORMATION RECORDING/REPRODUCING APPARATUS, INFORMATION REPRODUCING APPARATUS, AND INFORMATION RECORDING MEDIUM

CROSS-REFERENCE TO RELATED APPLICATIONS

This application is based upon and claims the benefit of priority from the prior Japanese Patent Application No. 2003-019396, filed Jan. 28, 2003, the entire contents of which are incorporated herein by reference.

BACKGROUND OF THE INVENTION

1. Field of the Invention

The present invention relates to a signal evaluation method for evaluating a signal reproduced from an information recording medium, an information recording/reproducing apparatus, and an information recording medium. More specifically, the present invention is directed to improvements in evaluation means and an evaluation method which reproduce a signal from the information recording medium and evaluates the reproduced signal.

2. Description of the Related Art

As signal processing performed by an information recording/reproducing apparatus, a PRML (partial response and maximum likelihood) discrimination method is known in the art.

Jpn. Pat. Appln. KOKAI Publication No. 2002-358738 discloses a technique for evaluating the signal quality in a system using the PRML discrimination method.

According to the technique of the KOKAI publication, a differential metric distribution is prepared. Based on the assumption that the differential metric distribution is a normal distribution, a standard deviation $\sigma$ and a mean value $\mu$ are obtained. Of the portions of the normal distribution, the portion whose peak is not more than 0 is detected, and an area (error rate) of the detected portion is calculated from the standard deviation $\sigma$ and the mean value $\mu$, using an error function.

The normal distribution is not necessarily accurate. In practice, a plurality of different normal distributions are superposed. This being so, the error rate cannot be accurately estimated, and the signal quality cannot be evaluated.

BRIEF SUMMARY OF THE INVENTION

Accordingly, an object of the present invention is to provide a method capable of accurately evaluating the signal quality. It is also an object of the present invention to provide an information recording/reproducing apparatus capable of performing signal recording and reproduction with high reliability. It is further an object of the present invention to provide an information recording medium for which information recording and reproduction can be performed with high reliability.

In principle, the present invention relates to a method which is adapted for an information recording/reproducing apparatus using the PRML discrimination method, and which comprises the steps of: detecting matching between identification data and a plurality of predetermined bit sequence pairs; calculating a bit sequence and corresponding two ideal responses when the matching is detected; obtaining Euclidean distances between the two ideal responses and equalization signals; obtaining a difference between the Euclidean distances; obtaining a mean value and a standard deviation with respect to the difference between the Euclidean distances; and calculating a quality evaluation value of a reproduction signal based on the mean value, the standard deviation, an appearance probability of the predetermined bit sequence, and a Hamming distance between the predetermined bit sequence pairs. It should be noted that the present invention is not limited to this, and covers the method, apparatus and medium to be described below.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
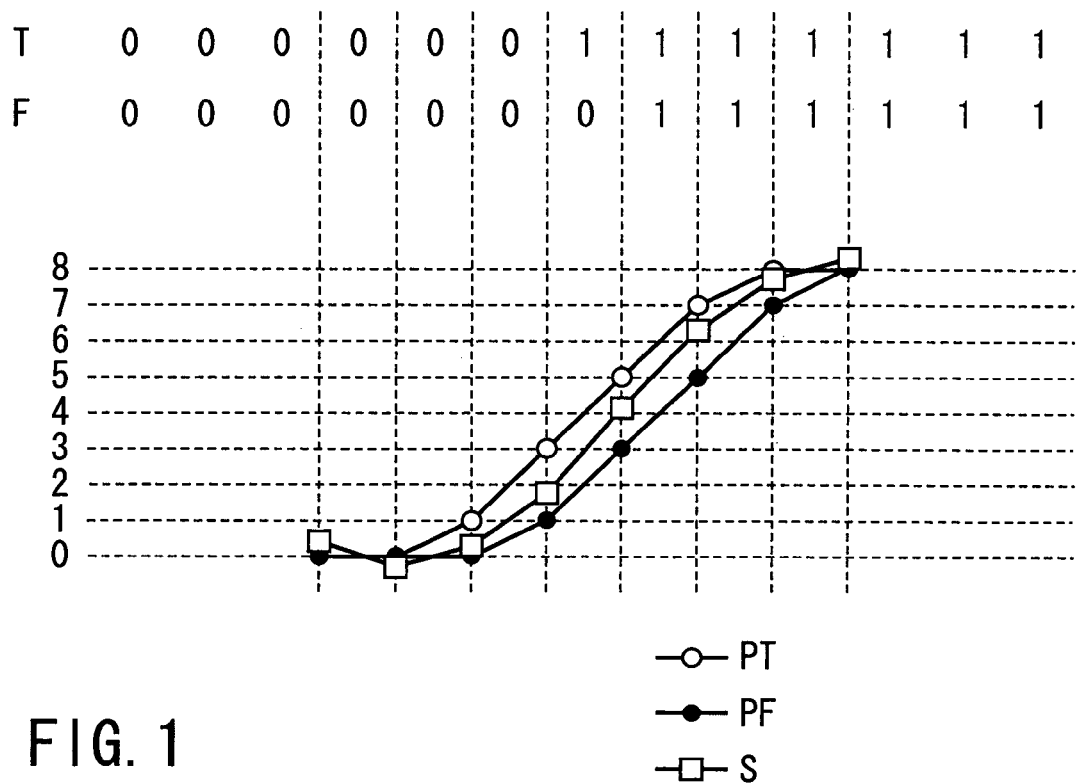
FIG. 1 is a waveform chart illustrating the fundamental principle of the present invention.

Embodiments of the present invention will now be described with reference to the accompanying drawings, referring to an information recording/reproducing apparatus, a signal evaluation method and an information recording medium.

First of all, a description will be given of the PRML discrimination method the present invention is based on. The PRML discrimination method utilizes PR (partial response) characteristics, which correspond to the recording/reproducing characteristics. By way of example, reference will be made to PR (1,2,2,1) characteristic. PR(1,2,2,1) characteristic refers to the case where the response to sign bit "1" is "1221". Convolution between a sign bit sequence and sequence "1221" is a response. For example, the response to sign bit sequence "0010000" is "0012210." Likewise, the response to sign bit sequence "00110000" is "00134310", the response to sign bit sequence "001110000" is "000135531", and the response to "00011110000" is "00013565310."

The aforesaid relationships between the sign bit sequences and the responses hold true only for ideal PR characteristics. Such responses as indicated above will therefore referred to as ideal responses. Since actual responses contain noise, the ML (maximum likelihood) identification compares noise-containing responses and ideal responses and selects and outputs an ideal response corresponding to the shortest distance.

In the ML discrimination, Euclidean distances are used as distances for comparison. The Euclidean distance $E^2$ between sequence A ($=A_0 A_1 \ldots A_n$) and sequence B ($=B_0 B_1 \ldots B_n$) is defined as follows:

$$E^2 = \Sigma (A_i - B_i)^2$$

Next, the Euclidean distances between all ideal responses of length-N samples and equalization signals (length-N samples) are subjected to SAM calculation. From among all Euclidean distances subjected to the calculation, the smallest value $E_{min}$ and the second smallest value $E_{next}$ are selected. The calculation expressed by $E_{min}^2 - E_{next}^2$ (=SAM) is executed with respect to the selected $E_{min}$ and $E_{next}$. The greater the value of $E_{min}^2 - E_{next}^2$ is, the less likely an identification error occurs.

A detailed description will be given, using specific numbers. Let us assume that S1 and S2 denote equalization signals of length-9 samples and have the following contents:

$S_1 = [5.9\ 6.1\ 5.9\ 4.9\ 2.9\ 0.9\ 0.1\ 0.0\ 0.1]$
$S_2 = [5.8\ 6.0\ 5.8\ 4.7\ 2.7\ 1.1\ 0.2\ 0.1\ 0.2]$

The ideal responses that enable the Euclidian distances of equalization signals $S_1$ and $S_2$ to become shortest are [6 6 6 5 3 1 0 0 0] (i.e., ideal responses of bit sequence [1 1 1 1 1 1 0 0 0 0 0 0]. Likewise, the ideal responses that enable the Euclidian distances of equalization signals $S_1$ and $S_2$ to become second shortest are [6 6 5 3 1 0 0 0 0] (i.e., outputs of bit sequence [1 1 1 1 1 0 0 0 0 0 0]).

$E_{min}^2$ and $E_{next}^2$ are calculated in relation to $S_1$ as below.

$$E_{min}^2 = (6 - 5.9)^2 + (6 - 6.1)^2 + (6 - 5.9)^2 + \cdots + (0 - 0.1)^2$$
$$= 0.08$$
$$E_{next}^2 = (6 - 5.9)^2 + (6 - 6.1)^2 + (5 - 5.9)^2 + \cdots + (0 - 0.1)^2$$
$$= 8.88$$

Likewise, $E_{min}^2$ and $E_{next}^2$ are calculated in relation to $S_2$ as below.

$$E_{min}^2 = (6 - 5.8)^2 + (6 - 6.0)^2 + (6 - 5.8)^2 + \cdots + (0 - 0.2)^2$$
$$= 0.36$$
$$E_{next}^2 = (6 - 5.8)^2 + (6 - 6.0)^2 + (5 - 5.8)^2 + \cdots + (0 - 0.2)^2$$
$$= 7.76$$

The value of $E_{min}^2 - E_{next}^2$ is 8.8 with respect to $S_1$, and is 7.4 with respect to $S_2$. This means that the occurrence of errors is less likely in the case of $S_1$.

As described above, a necessary number of SAM values are calculated, and an error rate is estimated on the basis of them. A description will now be given of how to estimate the error rate.

Of the distributions of SAM values, a distribution close to "0" is regarded as a normal distribution, and the standard deviation σ and the mean value μ of that normal distribution are obtained. Of the portions of the normal distribution, the portion whose peak is not more than 0 is detected, and an area (error rate) of the detected portion is calculated from the standard deviation σ and the mean value μ, using an error function.

In this case as well, the SAM distribution is a superposition of a plurality of normal distributions of different standard deviations and mean values, and the values lower than threshold value Th do not form a normal distribution. This being so, the error rate cannot be accurately estimated, and the signal quality cannot be evaluated.

Accordingly, the present invention is intended to provide a method that enables more reliable evaluation. In the description below, reference will be made to the case where the PR characteristic is PR(1,2,2,2,1) characteristic and the modulation code is (1,7) RLL code.

The principle of the present invention will be described prior to a detained description of specific embodiments. First, let us consider the probability that a given recording pattern T is mistakenly recognized as another pattern F in the PRML system. Assuming that a reproduced signal is denoted by S and the ideal signals of patterns T and F are denoted by PT and PF (FIG. 1), the conditions under which pattern T is mistakenly recognized as pattern F are expressed as follows:

$$D = E_{PF,S}^2 - E_{PT,S}^2 < 0 \quad (1)$$

$$E_{P1,P2} = \sqrt{\sum_i (P1_i - P2_i)^2} \quad (2)$$

In the above mathematical formulas, $E_{PF,S}$ denotes an Euclidean distance between ideal signal PF and reproduction signal S, $E_{PT,S}$ denotes an Euclidean distance between ideal signal PT and reproduction signal S, and $E_{P1,P2}$ denotes an Euclidean distance between signals P1 and P2.

Figure 2:
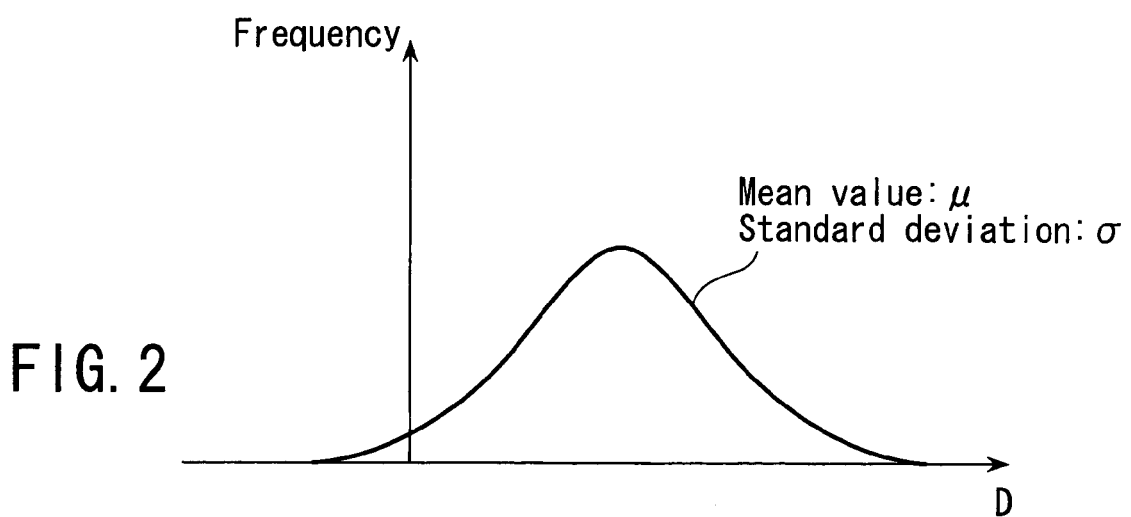
FIG. 2 is a distribution graph illustrating the fundamental principle of the present invention.

Assuming that the distribution (FIG. 2) of accumulated D values is a normal distribution and that the mean value and the standard deviation of that normal distribution are μ and σ, respectively, the probability of mistaken recognition of T as F is expressed by the following formula:

$$F(0) = \int_{-\infty}^{0} \frac{\exp\{-(x-\mu)^2 / 2\sigma^2\}}{\sigma\sqrt{2\pi}} dx \quad (3)$$

By performing calculation based on formula (3) with respect to a pair of patterns in which an error is likely to occur, an estimated value of bER (bit error) can be obtained as follows:

$$bER = \Sigma C_T \cdot F(0) \cdot H_{T,F} \quad (4)$$

where $C_T$ is a occurrence probability of pattern T, and $H_{T,F}$ is a Hamming distance between T and F.

How patterns T and F are selected will be briefly described. A Euclidian distance expressed by formula (2) is advantageously used when patterns T and F are selected. In general, an error occurrence probability decreases exponentially in response to an increase in the Euclidian distance $E_{T,F}$ between patterns T and F. Therefore, an estimated value of bER can be obtained by detecting a pair of patterns between which the Euclidian distance $E_{T,F}$ is shorter than a predetermined value.

Embodiment 1

Figure 3:
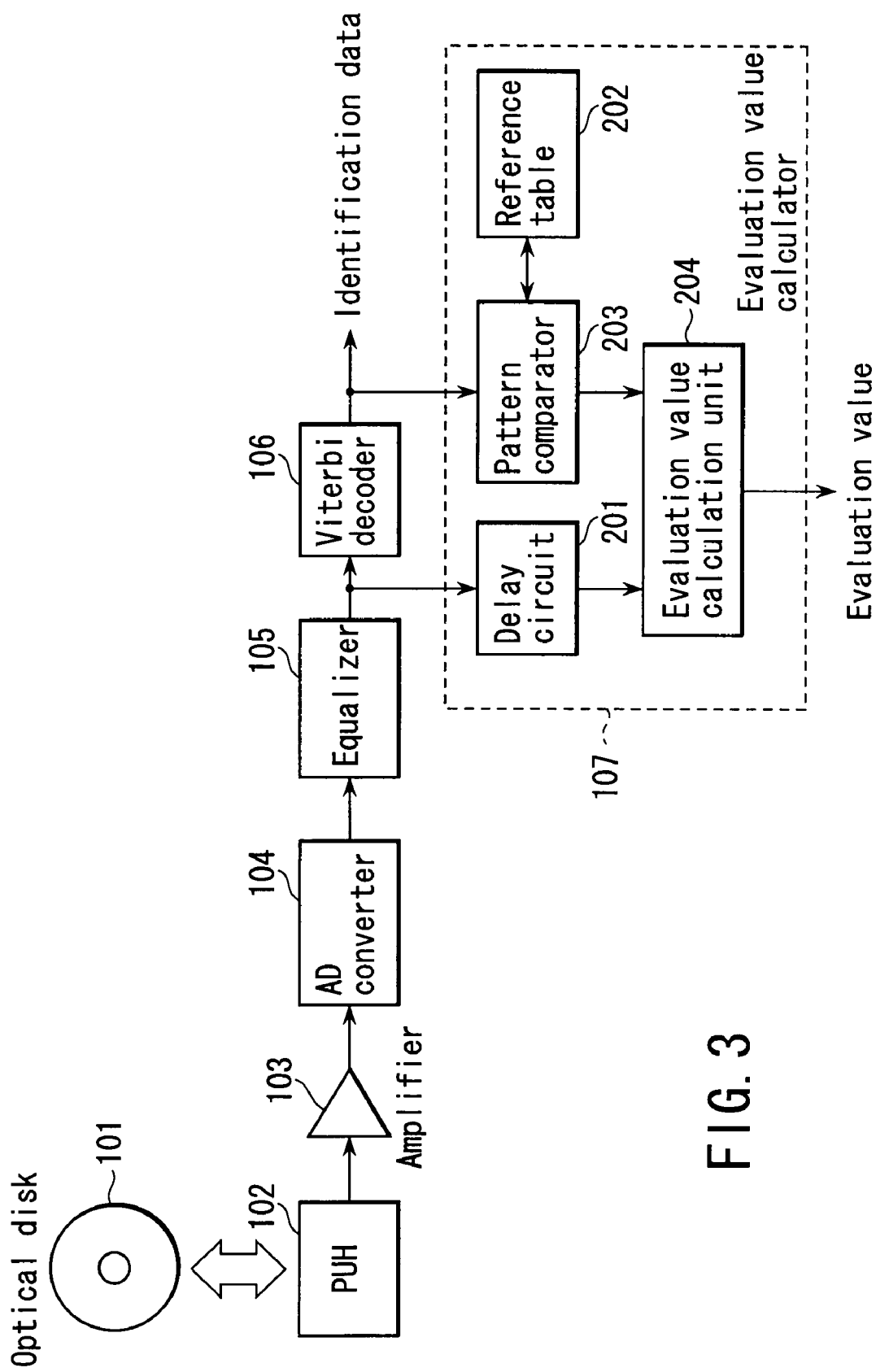
FIG. 3 is a block diagram illustrating one embodiment of the present invention.

FIG. 3 is a block diagram illustrating the configuration of one embodiment of the present invention. Referring to FIG. 3, information, which is recorded on an information recording medium (an optical disk) 101 as marks and spaces, is read out by an optical head device (PUH) 102 as feeble analog signals. An amplifier 103 amplifies the feeble analog signals to have sufficiently high levels. An analog-digital (AD) converter 104 converts the amplified analog signals into digital reproduction signals. An equalizer 105 equalizes the digital reproduction signals so that the digital reproduction signals have waveforms corresponding to a PR characteristic to be used (the digital reproduction signals having such waveforms will be hereinafter referred to simply as "equalization signals"). Then, the equalization signals are supplied to a Viterbi decoder 106 and an evaluation value calculator 107. The Viterbi decoder 106 decodes the equalization signals in accordance with the Viterbi algorithm, thereby obtaining binary identification data. The identification data is supplied to a circuit (not shown), and is delivered to the user after it is subject to decoding, error correction or another kind of processing desired. The identification data is supplied also to the evaluation value calculator 107 as well. Using the equalization signals and the identification data, the evaluation value calculator 107 calculates evaluation values.

The evaluation value calculator 107 comprises a delay circuit 201 which is used for timing, and a pattern comparator 203 which executes pattern comparison between the identification data and the data in a reference table. The evaluation value calculator 107 also comprises an evaluation value calculation unit 204 which executes evaluation value calculation by using equalization signals and ideal signals obtained by the pattern comparison.

Figure 4:
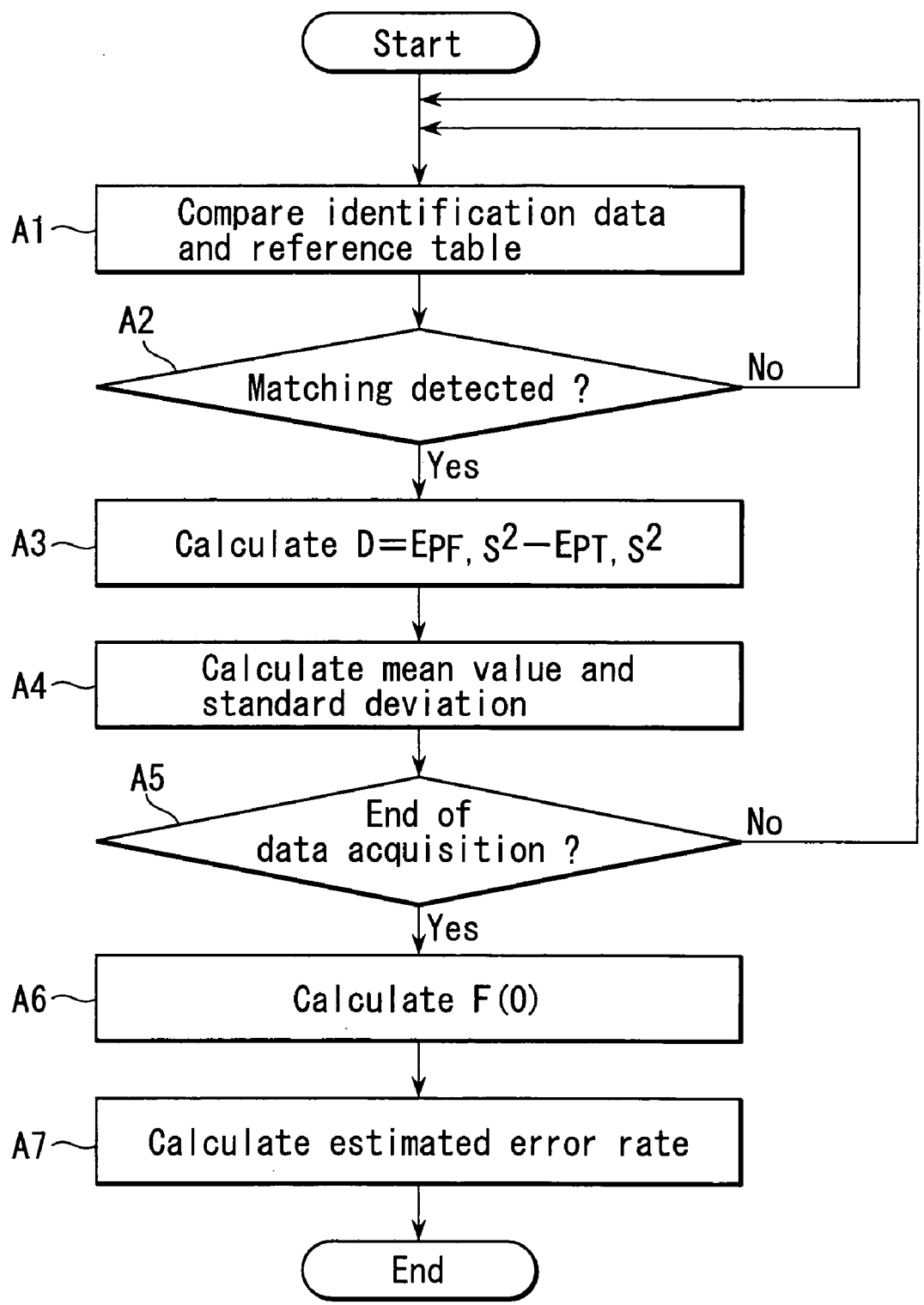
FIG. 4 is a flowchart illustrating how the present invention operates.

FIG. 4 illustrates how evaluation value calculation takes place. Identification data is acquired by the Viterbi decoder 106, and this identification data is compared with predetermined data patterns (reference data) stored in a reference table 202 (Step A1). The reference table 202 stores pattern pairs T and F which are likely to mix up. Pattern T is likely to be mistaken for pattern F; conversely, pattern F is likely to be mistaken for pattern T. When the comparison described above shows that the identification data matches data pattern T stored in the reference table 202, the values of D expressed by formula (1) are calculated, using equalization signals S, the ideal signal PT of pattern T, and ideal signal PF of pattern F. A mean value and a standard deviation are calculated with respect to a plurality of D values. When an ample number of pieces of data are processed and the data acquisition ends, the value of F(0) expressed by formula (3) is calculated. Then, the estimated error rate expressed by formula (4) is calculated. If the number of pieces of data is insufficient, it is not possible to accurately calculate the estimated error rate. The number of pieces of data should be 100,000 or more.

Table (1-1), tables (1-2) through (2-1) and table (2-2) are set forth at the end of the body of the specification. In these tables, examples of groups of pattern pairs T and F that are likely to mix up are indicated. To be more specific, pattern pairs T and F that are likely to mix up are classified into groups: the group shown in tables (1-1) and (1-2); and the group shown in tables (2-1) and (2-2). In each group, 108 pairs are shown, and the pairs in one group differ from those of the other in terms of the way in which they are classified.

The patterns of each of the 108 pattern pairs are equivalent to each other as far as their first four bits or the last four bits are concerned, but their intermediate bits differ from each other (T≠F). In addition, they satisfy the modulation rule of the (1,7) RLL code. In tables (1-1) and (1-2), each of the 108 pairs is regarded as a group, so that the total number of groups is 108. Since the patterns are classified in detail, the estimated error rate can be as accurate as possible. However, since the number of pieces of data that must be processed is large, the processing circuit is inevitably complex.

Tables (2-1) and (2-2) are intended to reduce the number of pieces of data processed, thereby enabling the use of a simple processing circuit, and also to fully satisfy the accuracy required of the estimated error rate. In tables (2-1) and (2-2), patterns are classified into groups, paying special attention to how many times the same code bit ("1" or "0") appears consecutively. In the following description, it is assumed that code bit "1" corresponds to a mark and code bit "0" corresponds to a space. A sequence in which code bit "1" appears consecutively n times (i.e., n straight code bits of "1") will be referred to as nTm, and a sequence in which code bit "0" appears consecutively n times (i.e., n straight code bits of "0") will be referred to as mTs. In tables (2-1) and (2-2), patterns are classified into groups as below. In the description below, reference will be made to the changes required for patterns T to become patterns F.

Group 1: the last code bit of 3Tm is changed to "0".
Group 2: the last code bit of 4Tm is changed to "0".
Group 3: the last code bit of nTm (n>4) is changed to "0".
Group 4: the first code bit of 3Tm is changed to "0".
Group 5: the first code bit of 4Tm is changed to "0".
Group 6: the first code bit of nTm (n>4) is changed to "0".
Group 7: the code bit subsequent to 2Tm is changed to "1".
Group 8: the code bit subsequent to 3Tm is changed to "1".
Group 9: the code bit subsequent to nTm (n>3) is changed to "1".
Group 10: the code bit immediately preceding 2Tm is changed to "1".
Group 11: the code bit immediately preceding 3Tm is changed to "1".
Group 12: the code bit immediately preceding nTm (n>3) is changed to "1".
Group 13: only 2Ts is shifted forward by 1 bit.
Group 14: only 2Tm is shifted rearward by 1 bit.
Group 15: only 2Ts is shifted rearward by 1 bit.
Group 16: only 2Tm is shifted forward by 1 bit.

Where the patterns are classified into groups as in tables (2-1) and (2-2), the total number of groups is 16. Since an increased number of patterns are processed as one group, the number of pieces of data required decreased, accordingly, and a simple processing circuit suffices.

In the grouping in tables (2-1) and (2-2), groups 1-3 utilize 3Tm, 4Tm and nTm (n>4), respectively, but 3Tm, 4Tm, 5Tm, nTm (n>5) may be used instead. In this case, the number of pattern pairs is increased, accordingly.

In the grouping in tables (2-1) and (2-2), special attention is paid to how many times code bit "1" appears consecutively (i.e., the length of a mark). The grouping shown in tables (2-1) and (2-2) is especially useful in evaluating a reproduction-only optical disk. The grouping may be based on code bit "0". Furthermore, the grouping of patterns need not be limited to the above, and a variety of methods can be used for the grouping of patterns. In actual evaluation, an optimal grouping method is determined depending upon the characteristics of a recording/reproducing system.

If the estimated value (estimated bER) calculated according to the method of embodiment 1 exceeds $1 \times 10^{-3}$, this means that there are a large number of discrimination errors that cannot be corrected even by subsequently-executed error correction processing. Therefore, information recording mediums are selected in such a way that the estimated bER becomes not more than $1\times10^{-3}$.

The estimated bER value must be not more than $1\times10^{-5}$ in consideration of various factors that deteriorate the performance of a recording/reproducing system, such as focusing errors and optical aberration. This being so, information recording mediums whose estimated bER values are not more than $1\times10^{-5}$ are selected.

Embodiment 2

Figure 5:
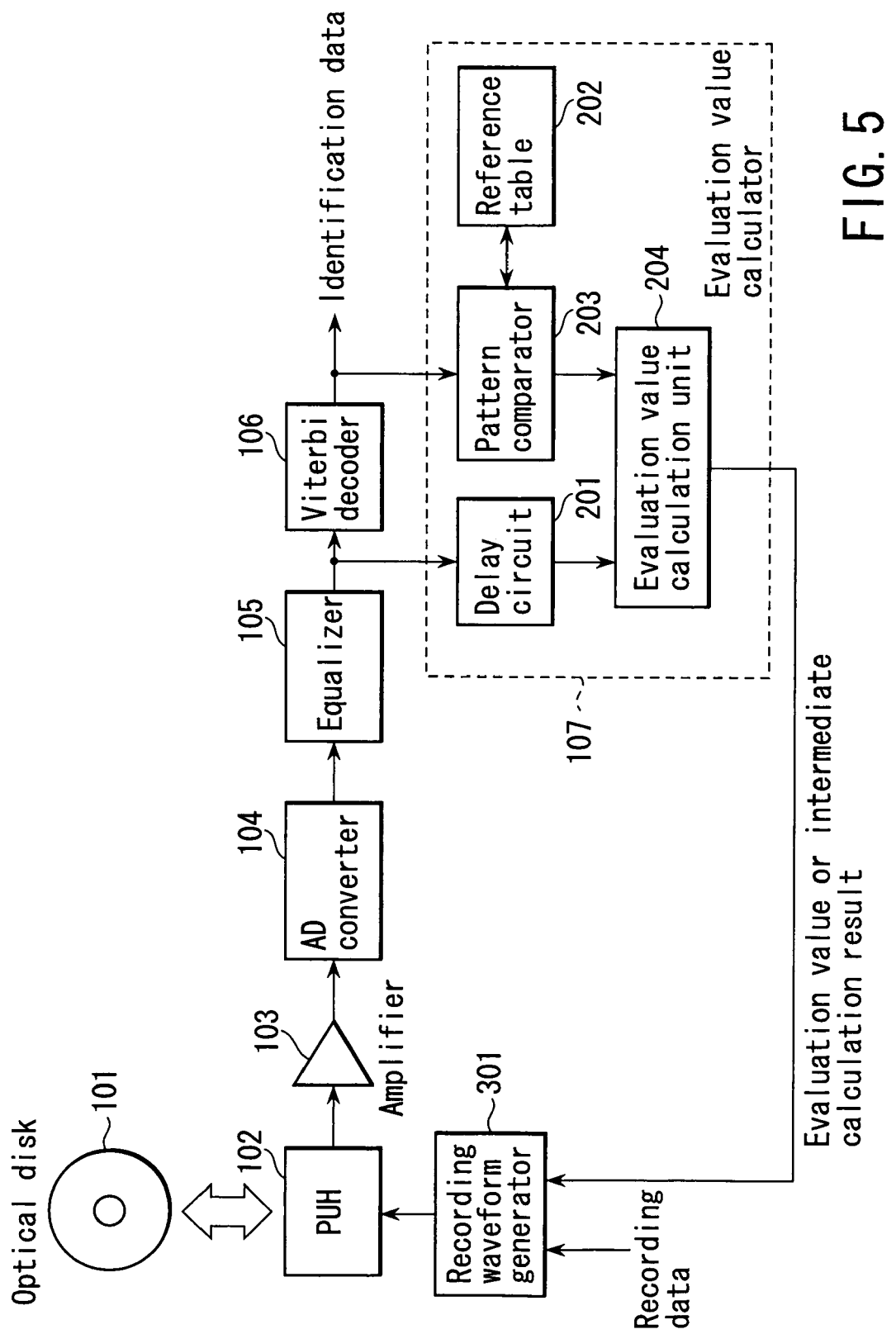
FIG. 5 is a block diagram illustrating another embodiment of the present invention.

FIG. 5 illustrates a waveform adjusting circuit that uses the estimated value described above or an intermediate calculation result used for calculating the estimated value. In FIG. 5, the same reference numerals as used in FIG. 3 represent similar or corresponding structural elements. In the system shown in FIG. 5, a recording waveform generator 301 makes recording parameter adjustment in such a manner that the evaluation value or the intermediate calculation result satisfies a predetermined value. Recording data subjected to the adjustment is supplied to an optical head device 102.

A description will be given as to how recording parameters are adjusted by referring to the reference tables described in tables (1-1) and (1-2) and using the mean value and standard deviation calculated for each group. Let us assume that the mean value is $\mu$ and the standard deviation is $\sigma$. In this case, the larger the value of $Z$ ($=\mu/\sigma$) is, the lower will be the probability of pattern T being mistaken for pattern F. Therefore, the recording parameters are appropriate when the value of Z is larger than a predetermined value. By way of example, let us consider the case where the value of Z is not larger than the predetermined value for groups 4 of tables (1-1) and (1-2). Groups 4 are groups containing consecutive patterns 3Tm and 3Ts that are mistaken for 2Tm and 4Ts, respectively. Where the value of Z of groups 4 are smaller than the predetermined value, a recording waveform generator adjusts the recording parameter to lengthen the rear end of the mark when the consecutive patterns 3Tm and 3Ts are recorded. Where the Z values of the other groups smaller than the predetermined value, the recording parameters are adjusted likewise, thereby lowering the probability of recognition errors. The direction in which the recording parameters should be adjusted (that is, whether a mark should be lengthened or shortened) is obvious from the attributes of a group. In the second embodiment, the value of Z ($=\mu/\sigma$) is used as an intermediate calculation result, but either F(0) of formula (3) or $C_T F(0) H_{T,F}$ obtained in the calculation process of formula (4) may be used instead.

In the above description, reference was made to the case where recording waveforms are adjusted using an intermediate calculation result. The present invention is not limited to this and is applicable to the control of focusing, tracking or tilting.

Embodiment 3

Figure 6:
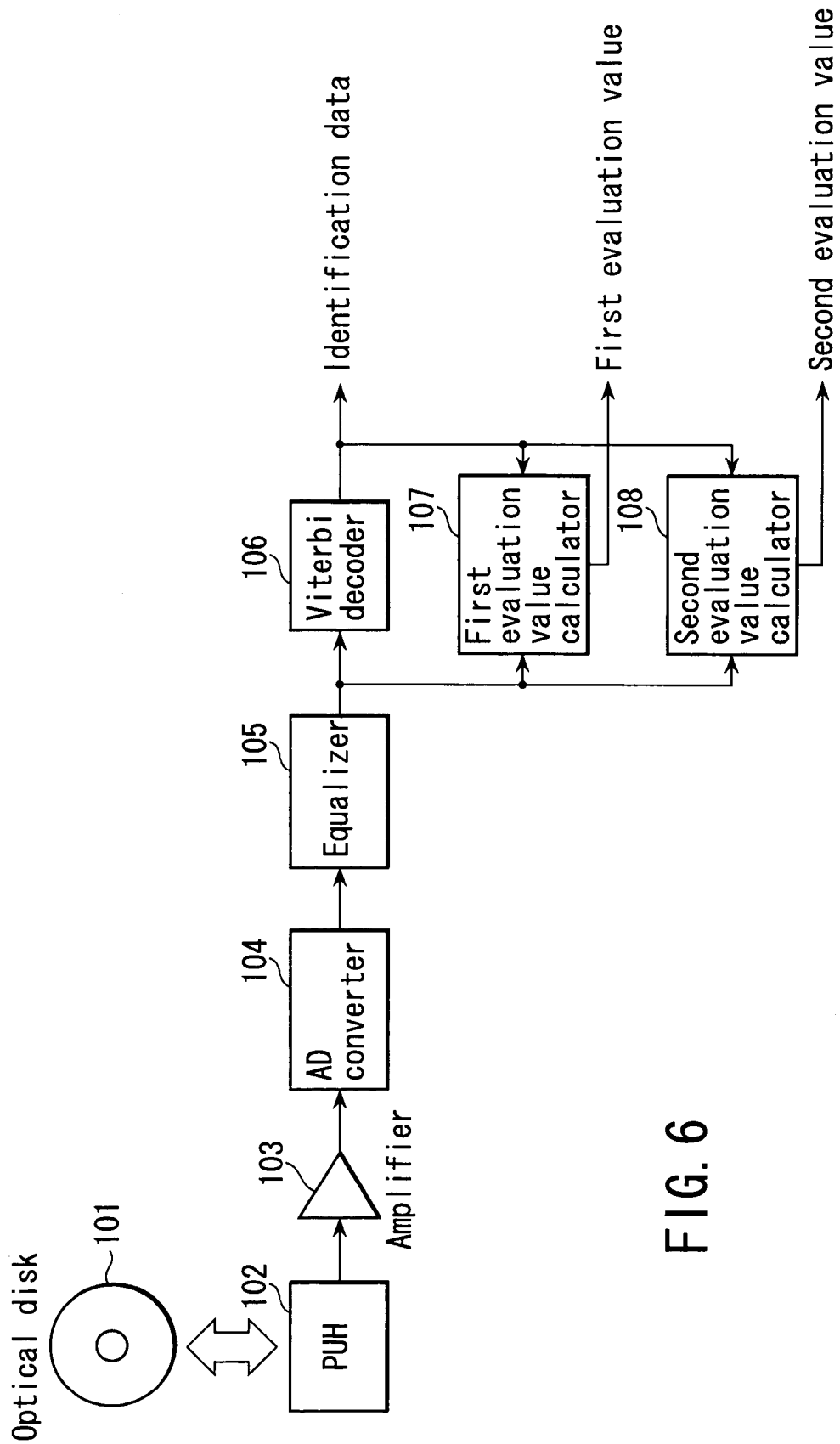
FIG. 6 is a block diagram illustrating still another embodiment of the present invention.
Figure 7:
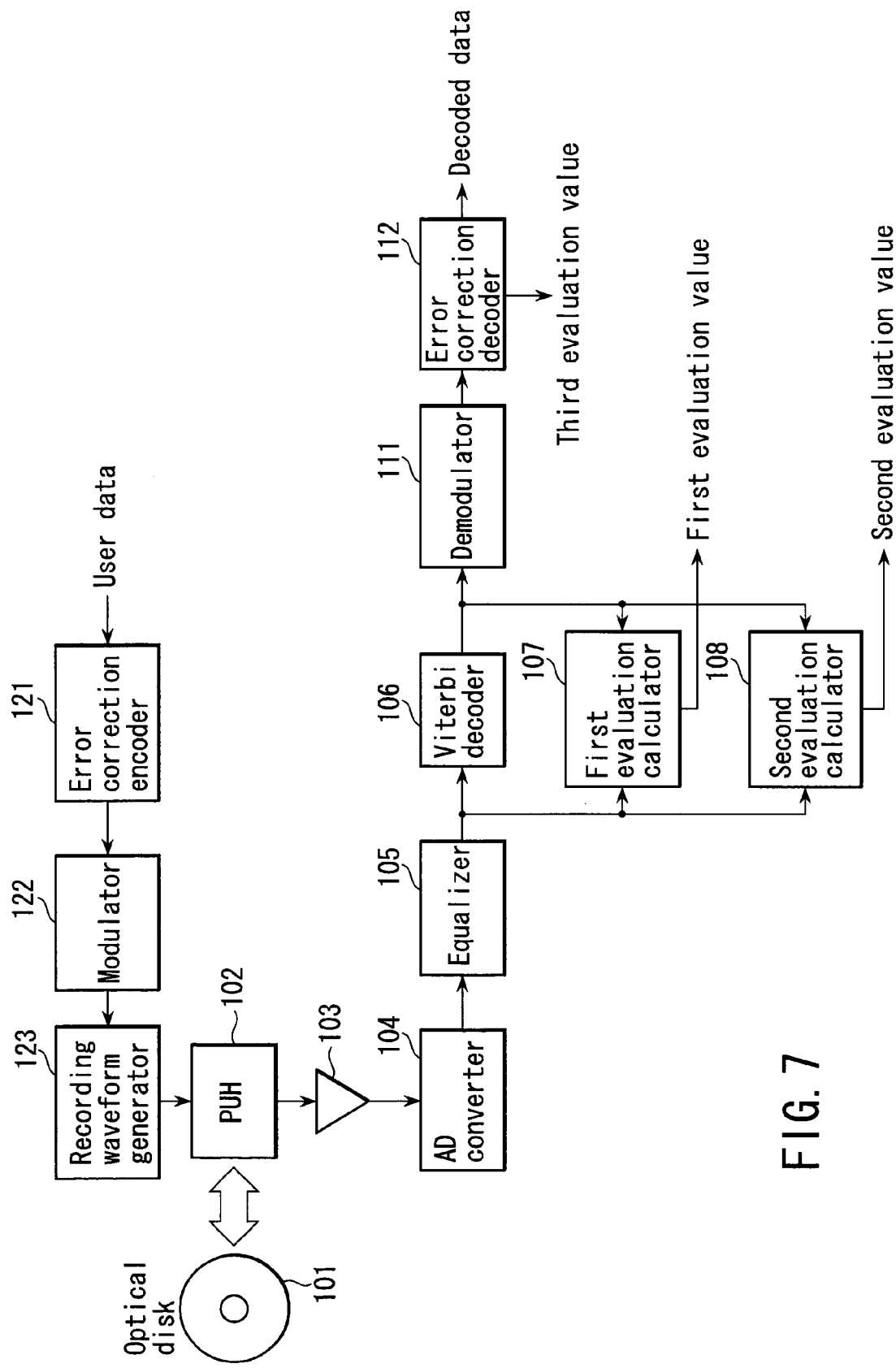
FIG. 7 is a block diagram illustrating a further embodiment of the present invention.

FIGS. 6 and 7 show the third and fourth embodiments of the present invention. The embodiment shown in FIG. 6 will be described prior to that shown in FIG. 7. Referring to FIG. 6, information, which is recorded on an information recording medium (an optical disk) 101 as marks and spaces, is read out by an optical head device (PUH) 102 as feeble analog signals. An amplifier 103 amplifies the feeble analog signals to have sufficiently high levels. An analog-digital (AD)converter 104 converts the amplified analog signals into digital reproduction signals. An equalizer 105 equalizes the digital reproduction signals so that the digital reproduction signals have waveforms corresponding to a PR characteristic to be used. Then, the equalization signals are supplied to a Viterbi decoder 106, a first evaluation value calculator 107 and a second evaluation value calculator 108.

The Viterbi decoder 106 decodes the equalization signals in accordance with the Viterbi algorithm, thereby obtaining binary identification data. The identification data is supplied to a circuit (not shown), and is delivered to the user after it is subject to decoding, error correction or another kind of processing desired. The identification data is supplied also to the first and second evaluation value calculators 107 and 108 as well. The first evaluation calculator 107 has a configuration equivalent to that shown in FIG. 3, and outputs a first evaluation value similar to the evaluation value shown in FIG. 3. The second evaluation value calculator 108 calculates a second evaluation value based on the equalization signals and the identification data.

The configuration of the second evaluation value calculator 108 and the second evaluation value will now be described.

In principle, the second evaluation value calculator 108 is used in a method for evaluating the quality of signals which are recorded on an optical disk medium beforehand by forming embossed portions, or which are recorded by use of an optical information recording apparatus. The second evaluation value calculator 108 calculates a target signal and an equalization error for each clock period. The target signal is obtained from a predetermined data sequence and a predetermined partial response characteristic, and the equalization error represents the difference between reproduced signals output in a clock period. Based on the autocorrelation, the second evaluation value calculator 108 evaluates the signal quality.

The operating principle underlying the second evaluation value calculator 108 will be described.

In the PRML method, data determination is made on the basis of an algorithm generally referred to as the Viterbi decoding. In the Viterbi decoding, the square of the difference between the value of a reproduced signal and the predetermined level determined by a partial response is calculated in each clock period, and the sum of the squares is calculated with respect to each path. The data is decoded by selecting the path for which the calculated sum of the squares is smallest.

In the Viterbi decoding, detection errors are likely to occur if the Euclidian distance between the paths is short. The Euclidian distance d between different paths is defined by $d^2 = 4\Sigma\epsilon i^2$, as will be described below. Let us assume that the polynomial expression determined for the data sequence $b_k$ along one path is $B(D) = \Sigma b_k D^k$, and the polynomial expression determined for the data sequence $c_k$ along another path is $C(D) = \Sigma c_k D^k$ ($b_k$, $c_k$: binary data of either "1" or "−1"). Let us also assume that the polynomial expression that defines a partial response is $H(D) = \Sigma h_k D^k$, and $N(D) = (B(D)-C(D))H(D) = 2\Sigma\epsilon_i D^i$. In this case, $d^2$ is calculated as being equal to $4\Sigma\epsilon_i^2$. It should be noted here that D is a time delay operator based on the clock time, and hk is a predetermined partial response characteristic. In general, a partial response is described as PR(h0, h1, h2, h3, . . . ) using those "hk" components which are not "zero".

Let us assume that the partial responses are determined such that h0=1, h1=2, h2=1, h3 and its succeeding values are all "0" (which case is expressed as PR(1,2,1)), data sequences $b_k$ are determined such that b0=1, b1=1, b2=−1, b3 and its succeeding values are all "−1", and data sequences ck are determined such that c0=−1, c1=1, c2=1, c3 and its succeeding values are all "−1". In this case, the Euclidian distance between the path extending along data sequence bk and the path extending along data sequence ck is calculated as follows:

$$N(D) = 2(1-D^2)(1+2D+D^2)$$
$$= 2*(1+2D-2D^3-D^4)$$

Hence, $$d^2 = 4*(1*1+2*2+2*2+1*1)$$

Binary data can be expressed in two ways: one is to use a combination of "1" and "0", and the other is to use a combination of "1" and "−1". The latter way is used in the specification of the present application.

Where a combination of "1" and "0" is used, the amplitude of a waveform is half that of the case where combination of "1" and "−1" is used. By the same token, the square of an Euclidian distance is one fourth of the square $d^2$ of the Euclidian distance described above. In short, the value of S described later should be reduced to one fourth.

Once the PR polynomial expressions are defined, it is possible to calculate the Euclidian distance between paths for each of combinations of $\epsilon_i$. In general, an optical disk uses recording codes satisfying the run length limit of d>=1. For example, where recording codes satisfy d=1, marks whose lengths are equal to 2T or greater are recorded on the optical disk. In order to take this into consideration in the calculation of Euclidian distances, the restriction expressed as $\epsilon_i \epsilon_{i+1} \neq -1$ should only be imposed on the combinations of $\epsilon_i$. To be more specific, the data sequences that satisfy $\epsilon_i \epsilon_{i+1} = -1$ include (x,1,−1,y) in the case of data sequence bk, and include (x,−1,1,y) in the case of data sequence ck. However, under the condition where d=1, such patterns as exemplified by (1, −1, 1) and (−1, 1, −1) are not allowed. For this reason, where x=−1 or y=1, there cannot be a pattern in which data sequence bk exceeds the run-length limit (a nonexistent pattern). Where x=1 or y=−1, there is a pattern in which data sequence ck exceeds the run-length limit. Therefore, no combination of data sequences bk,ck exists which would meet the run-length limit and yet satisfy the equation $\epsilon_i \epsilon_{i+1} = -1$. In the case where marks whose lengths are equal to 3T or greater are recorded on the optical disk, the restrictions expressed as $\epsilon_i \epsilon_{i+1} \neq -1$ and $\epsilon_j \epsilon_{j+2} \neq -1$ are imposed.

When data sequence bk is considered as a reference, the probability of occurrence of an error between two paths that are away from each other by Euclidian distance d, is equivalent to the probability of $\Sigma(y_k - \Sigma b_{k-i} h_i)^2$ becoming greater than $\Sigma(y_k - \Sigma c_{k-i} h_i)^2$ due to noise. When data sequence bk is considered as a reference, $y_k - \Sigma b_{k-i} h_i$ is an equalization error. Which value, $\Sigma(y_k - \Sigma b_{k-i} h_i)^2$ or $\Sigma(y_k - \Sigma c_{k-i} h_i)^2$, is larger can be determined by assuming that a polynomial coefficient defined by the difference between B(D)H(D) and C(D)H(d) is a vector component, defining an error vector based on the assumption, and projecting the equalization error on the error vector. In this case, the probability of occurrence of a detection error is defined as the probability of the noise value (the noise dispersion) becoming larger than half of the Euclidian distance between paths. It is therefore possible to evaluate the signal quality by calculating the ratio of the Euclidian distance between paths to the noise dispersion projected on the error vector. Where a data sequence to be used as a reference is known beforehand (e.g., at the time of adjusting recording conditions), it is used as it is. Conversely, where the data sequence to be used a reference is not known beforehand, binary data output from the Viterbi decoder 106 may be used as probable data.

Let us assume that data sequences $b_k$ are determined such that $b_0=-1$, $b_1=1$, $b_2$ and its succeeding values are all "1", and data sequences ck are determined such that $c_0=1$, $c_1$ and its succeeding values are all "1". In this case, $\epsilon_0$ is equal to "1" and $\epsilon_1$ and its succeeding values are all "0" in the formula $A(D)=C(D)-B(D)=2\Sigma \cdot_j D^j$.

Where H(D) is defined as h0=1, h1=2, h2=2 and h3=1 (which corresponds to the case of PR(1,2,2,1)), the coefficients $\epsilon_i$ of the polynomial $N(D)=A(D)H(D)=2\Sigma\epsilon_i D^i$ defining the error vector are (1,2,2,1) in the order of $\epsilon_0$, $\epsilon_1$, $\epsilon_2$ and $\epsilon_3$. With respect to PR(1221), therefore, the probability of data sequence bk being mistaken as data sequence ck is higher than the probability of the value of the equalization error projected on 2*(1,2,2,1) becoming larger than half of the Euclidian distance between two paths (the Euclidian distance in this case is $2*(1+2*2+2*2+1)^{1/2}$). How the equalization error is projected on the error vector is expressed as follows:

$$\frac{2\sum_i \varepsilon_i v_{k+i}}{2\sqrt{\sum_i \varepsilon_i^2}} \tag{5}$$

Hence, the dispersion CN of the noise projected on the error vector is expressed as follows:

$$CN = \frac{\sum_{k=1}^{N}\left(\sum_i \varepsilon_i v_{k+i}\right)^2}{N\sum_i \varepsilon_i^2} \tag{6}$$

Half of the Euclidian distance between two paths (i.e., a value corresponding to the signal amplitude) is expressed as follows:

$$\sqrt{\sum_i \varepsilon_i^2} \tag{7}$$

The square E of the amplitude (the value of E corresponds to electric power) is obtained as follows:

$$E = \sum_i \varepsilon_i^2 \tag{8}$$

As can be seen from this, E/CN is obtained as an index correlated with the probability of an error. (The coefficient "2", which is a multiplier of both A(D) and N(D), does not have any effects on the results of calculation. Therefore, the coefficient "2" can be omitted and the formulas can be simplified as $A(D)=\Sigma\epsilon_j D^j$ and $N(D)=\Sigma \cdot_i D^i$. The result of calculation remains the same in this case as well.)

As described above, with respect to the value $y_k$ of a reproduction signal output in each clock period, the predetermined data sequence $a_k$ used for generating a target signal and the predetermined partial response characteristic $h_k$, the following are determined: an equalization error is determined as $y_k=(y_k-\Sigma a_{k-i}h_i)$, a time delay operator expressed based on the clock time is determined as D, a polynomial expression including coefficient $\alpha_j$ which takes one of three kinds of values "1", "0" and "−1" and which satisfies the condition $\alpha_j \alpha_{j+1} \neq -1$ is determined as $A(D)=\Sigma \alpha_j D^j$, a PR polynomial expression for defining a partial response is determined as $H(D)=\Sigma h_k D^k$. Based on the polynomial expression defined as $N(D)=A(D)H(D)=\Sigma \epsilon_i D^i$, a signal quality evaluation value is calculated using formula (9) below.

$$S = \frac{N\left(\sum_i \epsilon_i^2\right)^2}{\sum_{k=1}^{N}\left(\sum_i \epsilon_i v_{k+i}\right)^2} \tag{9}$$

By calculating the signal quality evaluation value as above, it is possible to evaluate the probability of occurrence of a detection error, namely, the signal quality of a reproduction signal.

In the above description, bk and ck were referred to as data sequences that were likely to mix up. It should be noted, however, that only bk need not be selected for the calculation of an equalization error when the dispersion of the noise projected on an error vector is calculated. In other words, the dispersion of equalization errors need not be calculated by extracting the points of time corresponding to data sequence bk from data sequence ak used for generating a target signal. That is, the dispersion may be calculated using the equalization error calculated in each clock time. As long as the distribution of equalization errors conforms to a Gaussian distribution and is therefore probabilistic, the same dispersion is calculated without reference to the distribution data used for calculation. In other words, whether specific distribution portions are extracted for calculation or the entire distribution is used for calculation, the same dispersion is calculated. Needless to say, the calculation of noise dispersion may be based on a specific data sequence bk, but it is advantageous to calculate the dispersion of equalization errors without selecting any particular pattern because this way for calculation does not require a complicated circuit configuration.

Figure 8:
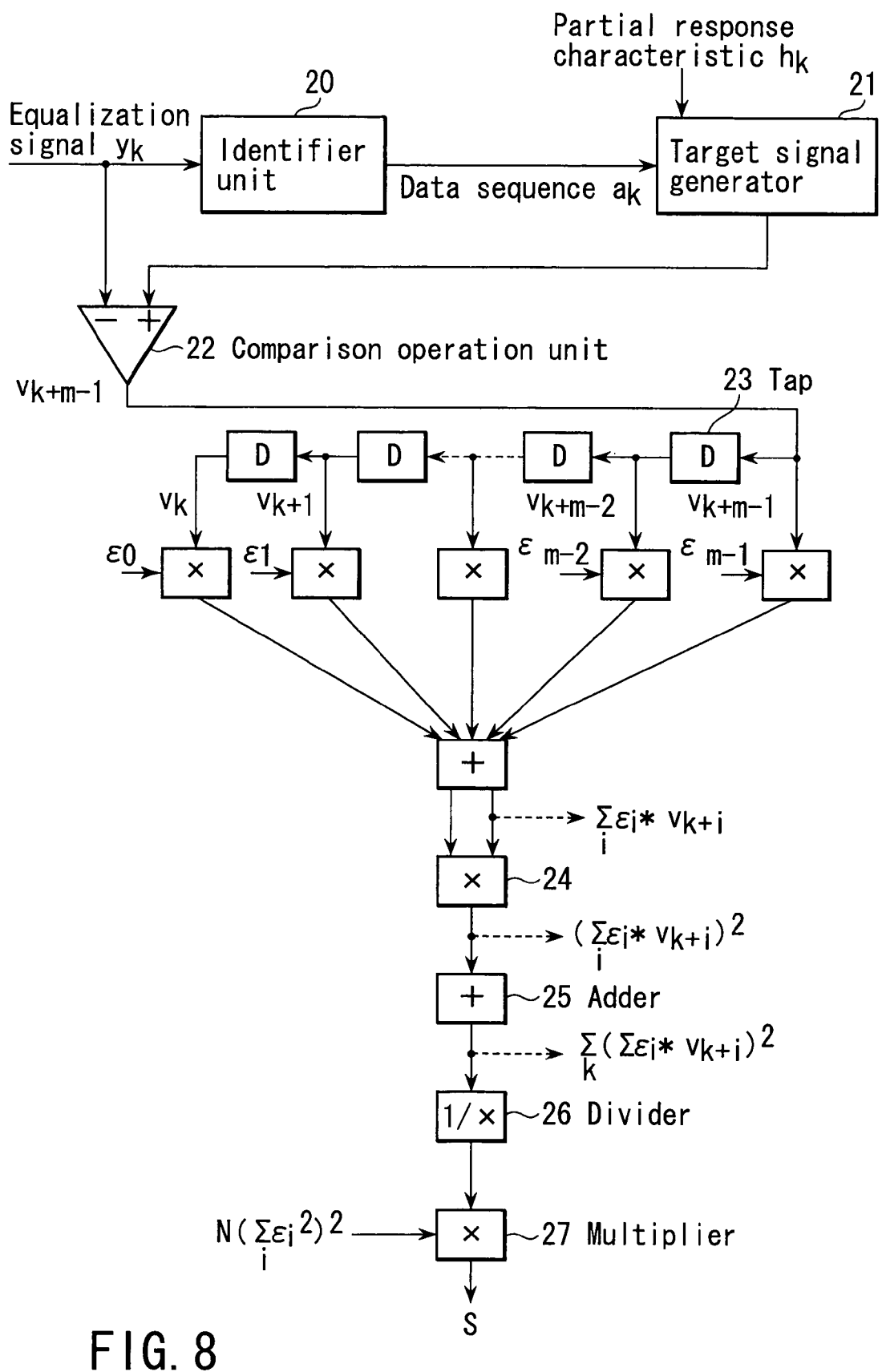
FIG. 8 is a block diagram illustrating one example of a second evaluation value calculator which can be used in the embodiments shown in FIGS. 6 and 7.

FIG. 8 is a block diagram illustrating one example of the second evaluation value calculator used for calculating the signal quality evaluation value S. A reproduction waveform is supplied to an AD converter, by which it is sampled based on a predetermined frequency. After this sampling, the reproduction waveform is supplied to an equalizer including a PLL (phase-locked loop) circuit. The equalizer outputs equalization reproduction waveform data in each clock period. The equalization is performed in such a manner as to suppress the noise components and permit the reproduction waveform to be as analogous as possible to a target waveform based on a PR waveform. A signal quality evaluator 108 calculates signal quality evaluation value S on the basis of the equalization reproduction waveform it receives, and evaluates the quality of the reproduction waveform. It should be noted that in the case of a reproduction-only optical disk and a recordable optical disk on which data is recorded by another recording apparatus, original data ak recorded on the disk is not necessarily known beforehand. In such a case, binary data obtained by the discriminator (Viterbi decoding) of the signal quality evaluator 108 may be used as ak.

Assuming that a reference PR waveform is hi and binary data obtained by a discriminator (which is typically a Viterbi decoder) is ak, a target signal generator 21 generates a target signal Rk on the basis of formula (10) set forth below.

$$Rk = \sum_i a_{k-i} \times h_i \tag{10}$$

A comparison operation unit 22 outputs equalization error vk, which is the difference between equalization reproduction signal $y_k$ corresponding to each clock period and Rk. To project equalization errors on a error vector, taps 23 delay the equalization errors by the length of time corresponding to each clock period. The equalization errors are added together after processing them based on tap coefficient $\epsilon_i$. $\epsilon_i$ is a coefficient of N(D) described above. Combinations of $\epsilon_i$ are discriminated using j, and the value of S corresponding to them is defined as Sj. In this case, the total number m of taps (D) varies depending upon j. By way of example, let us assume that the combination of $\epsilon_i$ corresponding to j=1 is determined such that $\epsilon_0=1, \epsilon_1=1, \epsilon_2=0, \epsilon_3=0, \epsilon_4=1$ and $\epsilon_5$ and its succeeding values are all "0", and that the combination of $\epsilon_i$ corresponding to j=2 is determined such that $\epsilon_0=1, \epsilon_1=2, \epsilon_2=1$, and $\epsilon_3$ and its succeeding values are all "0". In this case, "m=4" is used when calculating S1, "m=2" is used when calculating S2. If it is onerous to change the number of taps in accordance with the combination j, a sufficiently large number of taps (e.g., 15 to 20 taps) are prepared, and the tap coefficients that are not required for calculation are set at "0".

The equalization errors added together based on the tap coefficients, and the square of the sum of the equalization errors is calculated by a multiplier 24. An adder 25 adds squares until the total number of equalization error samples becomes N. A value obtained as a result of this addition changes in proportion to the dispersion of noise projected on an error vector. (If the value is divided by N and $\Sigma \epsilon_i^2$, the quotient represents a dispersion. However, since N and $\Sigma \epsilon_i^2$ are constants, they are used as a coefficient of the multiplier 24.) A divider 26 outputs the reciprocal number of the value described above, and a multiplier 27 outputs mathematical product $(N\Sigma \epsilon_i^2)*\Sigma \epsilon_i^2$, thereby calculating the value of S. The total number of reproduction waveform samples should accurately be N+m. However, since m is 20 at most, as against more than $10^4$ of N, the total number of samples required (which will be referred to later) is described as N throughout the specification.

Another embodiment of the present invention used for calculating the value of S will now be described.

Another embodiment is directed to a method of evaluating the quality of signals recorded on an optical disk. The method uses partial responses of $h_0=1, h_1=2, h_2=2, h_3=2$ and $h_4=1$, and evaluates the signal quality on the basis of the values of S calculated with respect to the combinations of $\epsilon$ that permits the value of d to be 12 and 14. The embodiment is directed also to a method of evaluating the quality of signals recorded on an optical disk, using partial responses of $h_0=1, h_1=2, h_2=2, h_3=2$ and $h_4=1$, and on the basis of the values of S calculated with respect to at least the following three combinations of $\epsilon$:

$\epsilon$  $\epsilon_0=1, \epsilon_1=2, \epsilon_2=2, \epsilon_3=2, \epsilon_4=1$ $\epsilon$  $\epsilon_0=1, \epsilon_1=2, \epsilon_2=1, \epsilon_3=0, \epsilon_4=-1, \epsilon_5=-2, \epsilon_6=-1,$ $\epsilon$  $\epsilon_0=1, \epsilon_1=2, \epsilon_2=1, \epsilon_3=0, \epsilon_4=0, \epsilon_5=0, \epsilon_6=1, \epsilon_7=2, \epsilon_8=1$ By utilizing the equation $\Sigma(v_{k}+2v_{k+1}+2v_{k+2}+2v_{k+3}+v_{k+4})^2 = N*(14R_0+24R_1+16R_2+8R_3+2R_4)$ (R is defined as $\Sigma v_k v_{k+1}/N$) to the first combination of $\epsilon$, S can be expressed as in formula (11) set forth below.

$$SI = \frac{14 \times 14}{14R_0 + 24R_1 + 16R_2 + 8R_3 + 2R_4} \quad (11)$$
$$= \frac{14}{R_0 + (12R_1 + 8R_2 + 4R_3 + R_4)/7}$$

By applying the above equation to the second and third combinations of ε, S2 and S3 can be written as in equations (12) and (13) set forth below.

$$S2 = \frac{12 \times 12}{12R_0 + 16R_1 + 2R_2 - 8R_3 - 12R_4 - 8R_5 - 2R_6} \quad (12)$$
$$= \frac{12}{R_0 + (8R_1 + R_2 - 4R_3 - 6R_4 - 4R_5 - R_6)/6}$$

$$S3 = \frac{12 \times 12}{12R_0 + 16R_1 + 4R_2 + 2R_4 + 8R_5 + 12R_6 + 8R_7 + 2R_8} \quad (13)$$
$$= \frac{12}{R_0 + (8R_1 + 2R_2 + R_4 + 4R_5 + 6R_6 + 4R_7 + R_8)/6}$$

In the above equations, Ri is the autocorrelation of an equalization error. When the values other than R0 are "0", the equalization error is white.

As described above, the reproduction method using PR(12221) equalization performs a predetermined product-sum operation with respect to the autocorrelation of equalization error $V_m$ obtained at each clock time so, thereby obtaining the values S1, S2 and S3 given in the formulas (1-1), (1-2) and (1-3) below. The quality of a reproduced signal can be evaluated by detecting the smallest value of S1, S2 and S3.

$$S1 = 14/\sigma_1^2, \sigma_1^2 \quad (1-1)$$
$$= R_0 + (12R_1 + 8R_2 + 4R_3 + R_4)/7, Ri$$
$$= \sum_{m=1}^{m=n}(V_m V_{m+j})/N$$

$$S2 = 12/\sigma_2^2, \sigma_2^2 \quad (1-2)$$
$$= R_0 + (8R_1 + R_2 - 4R_3 - 6R_4 - 4R_5 - R_6)/6, Ri$$
$$= \sum_{m=1}^{m=n}(V_m V_{m+j})/N$$

$$S1 = 12/\sigma_3^2, \sigma_3^2 \quad (1-3)$$
$$= R_0 + (8R_1 + 2R_2 + R_4 + 4R_5 + 6R_6 + 4R_7 + R_8)/6, Ri$$
$$= \sum_{m=1}^{m=n}(V_m V_{m+j})/N$$

Figure 9:
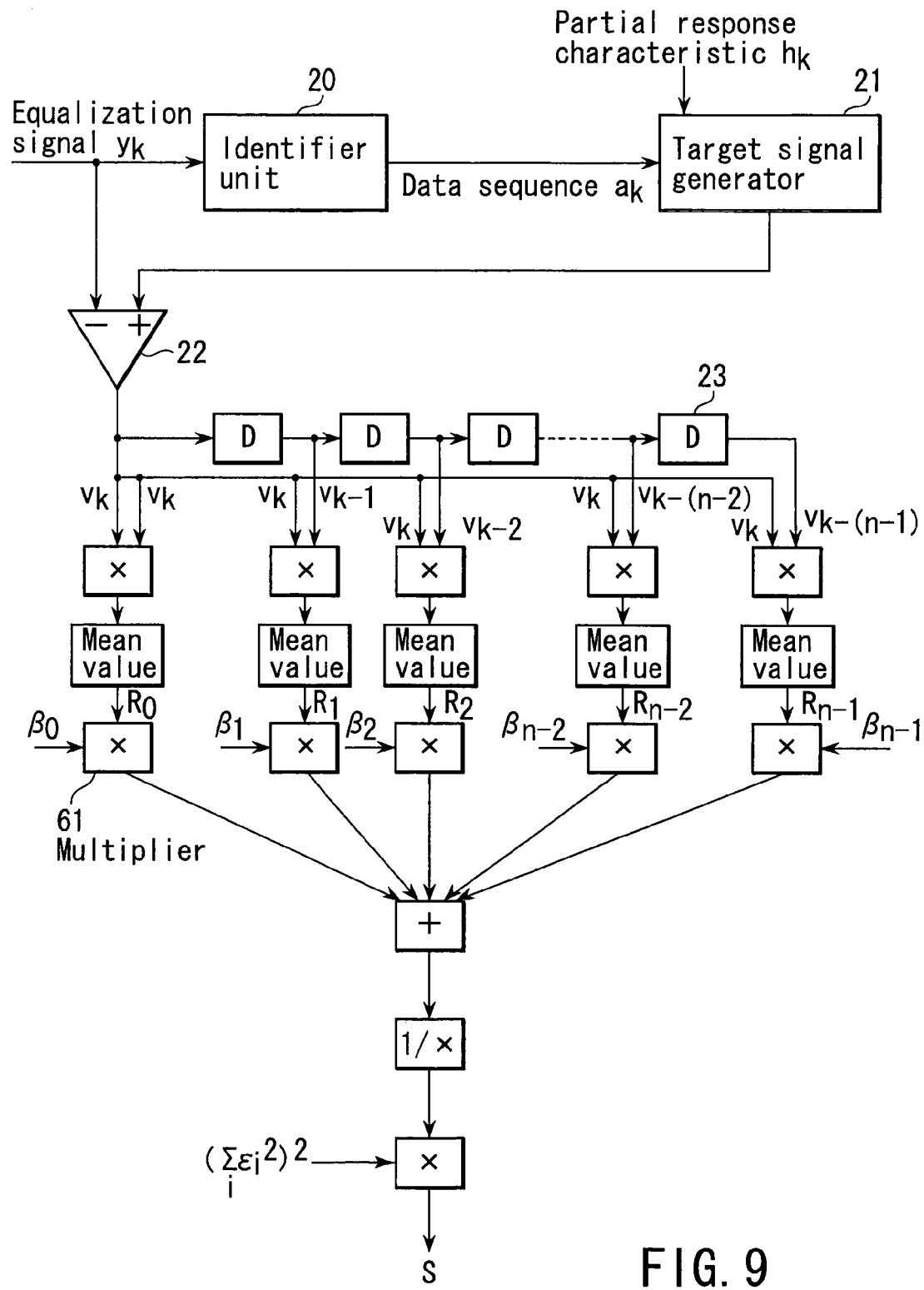
FIG. 9 is a block diagram illustrating another example of a second evaluation value calculator which can be used in the embodiments shown in FIGS. 6 and 7.

FIG. 9 is a block diagram illustrating another example of the second evaluation value calculator used for calculating the signal quality evaluation value S. The second evaluation value calculator of FIG. 9 differs from that shown in FIG. 8 in that autocorrelations of equalization errors are calculated, are weighted in a predetermined manner (i.e., they are multiplied based on coefficient $\beta_i$ by means of multipliers 61), and are then added together. When, for example, S1 is calculated, the coefficients $\beta_i$ of the multipliers 61 can be determined as $\beta_0=14, \beta_1=24, \beta_2=16, \beta_3=8$ and $\beta_4=2$ when the numerator of S1 is 14*14, and as $\beta_0=14/14, \beta_1=24/14, \beta_2=16/14, \beta_3=8/14$ and $\beta_4=2/14$ when the numerator of S1 is 14. The number of multipliers 61 (FIG. 9) required is dependent on Sj to be calculated, and nine multipliers are required for calculating S3. If it is onerous to change the number of multipliers in accordance with patterns, a sufficiently large number of multipliers (e.g., 15 to 20 multipliers) are prepared, and the multipliers' coefficients that are not required for calculation are set at "0".

The configuration shown in FIG. 9 may be modified in such a way as not to calculate mean values (division by sample total number N is not performed). In such a case, what is required is to calculate a sum and multiply the numerator of S (the numerator is either 12 or 14 in this embodiment) with N.

Reproduction-only optical disks and phase-change disks were actually evaluated, using the configuration shown in FIG. 9. It was confirmed that the value of S obtained with the embodiment of FIG. 9 is equal to that obtained with the embodiment of FIG. 8. If it is clear that the equalization errors are white in characteristic, or if it is known beforehand that they are similar to white, the configuration may be limited to that required for calculating only R0.

Figure 10:
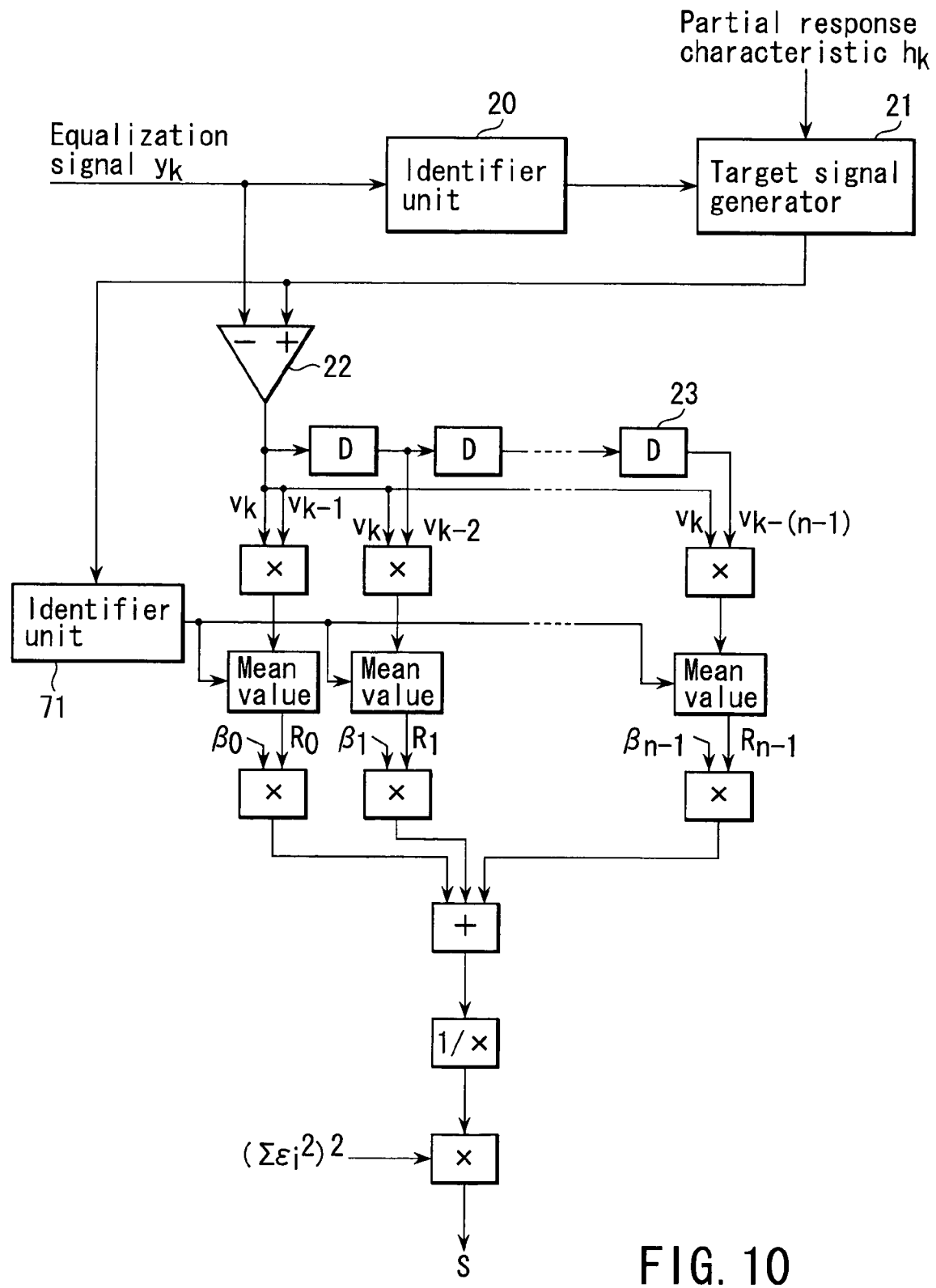
FIG. 10 is a block diagram illustrating still another example of a second evaluation value calculator which can be used in the embodiments shown in FIGS. 6 and 7.

In the embodiments described above, the signal quality is evaluated on the basis of equalization errors corresponding to clock times, without making determination with respect to the data sequences that are likely to mix up. However, the present invention is not limited to this configuration. For example, those data sequences that are likely to mix up may be selected, and equalization errors corresponding to such data sequences may be used for evaluating the signal quality of the signals of an optical disk. Where this configuration is adopted, the signal quality evaluation device shown in FIG. 8 or 9 is provided with a determination device 71, such as that shown in FIG. 10. In this case, equalization errors are collected with respect to only the data patterns that are likely to mix up, and subjected to evaluation. The determination device 71 shown in FIG. 10 has a function of outputting evaluation errors to processing blocks with respect to predetermined patterns only.

The system described above enables evaluation of the quality of signals even if those signals are recorded on an information recording medium in such a high density mode as does not permit signal quality evaluation based on jitter. In addition, the system enables determination of optimal recording and reproduction conditions, using the evaluated signal quality as an index.

The system described above can be summarized as follows:

(a) The system is applied to a method for evaluating the quality of signals which are recorded on an optical disk medium beforehand by forming embossed portions, or which are recorded by use of an optical information recording apparatus. The system calculates a target signal and an equalization error for each clock period. The target signal is obtained from a predetermined data sequence and a predetermined partial response characteristic, and the equalization error represents the difference between reproduced signals output in a clock period. Based on the autocorrelation of the equalization error, the system evaluates the signal quality.

(b) The system is applied to a method for evaluating the quality of signals which are recorded on an optical disk medium beforehand by forming embossed portions, or which are recorded by use of an optical information recording apparatus. The system projects an equalization error on a noise vector defined by both the difference between two data sequences and a partial response characteristic. The system examines how the dispersion of the projected equalization error is, and further examines how a Euclidean distance is defined by the difference between the two data sequences and the partial response characteristic. Based on the ratio of the dispersion to the Euclidean distance, the system evaluates the signal quality.

(c) The system is applied to a method for evaluating the quality of signals which are recorded on an optical disk medium beforehand by forming embossed portions, or which are recorded by use of an optical information recording apparatus. With respect to the value $y_k$ of a reproduction signal output in each clock period, the predetermined data sequence $a_k$ used for generating a target signal and the predetermined partial response characteristic $h_k$, the system makes the following determinations: an equalization error is determined as $v_k=(y_k-\Sigma a_{k-i}h_i)$; a time delay operator expressed based on the clock time is determined as D; a polynomial expression including coefficient $\alpha_j$ which takes one of three kinds of values "1", "0" and "−1" and which satisfies the condition $\alpha_j\alpha_{j+1}\neq-1$ is determined as $A(D)=\Sigma\alpha_j D^j$; a PR polynomial expression for defining a partial response is determined as $H(D)=\Sigma h_k D^k$. Based on the polynomial expression defined as $N(D)=A(D)H(D)=\Sigma\epsilon_i D^i$, the system calculates a value defined in formula (14) below.

$$S = \frac{N\left(\sum_i \varepsilon_i^2\right)^2}{\sum_{k=1}^{N}\left(\sum_i \varepsilon_i v_{k+i}\right)^2} \quad (14)$$

Based on the calculated value, the system evaluates the quality of the signals recorded on the optical disk.

(d) Of the combinations of $\epsilon_i$ described in (c) above, at least the combination of $\epsilon$ that allows $d=\Sigma\epsilon_i^2$ to become smallest and the combination of $\epsilon$ that allows $d=\Sigma\epsilon_i^2$ to become second smallest are detected. On the basis of the values of S corresponding to at least these two combinations, the system evaluates the quality of signal recorded on the optical disk.

A recognition error is likely to occur at a transitional point of time when the code bit changes from "0" to "1" or from "1" to "0". The bit error rate can be estimated based only on bit sequences which may give rise to a recognition error. On the other hand, the PRML method is a discrimination method that assumes the linearity of reproduction signals. If the quality of the signals other than the bit sequences that are likely to give rise to a recognition error is poor, the PRML discrimination circuit may not operate properly. Therefore, all signals must provide linearity when their quality is evaluated.

The signal quality evaluation method of the first evaluation value calculator of the present invention estimates a bit error rate. On the other hand, the signal quality evaluation method of the second evaluation value calculator evaluates the linearity of equalization signals. Since both the bit error rate and the linearity, it is possible to select mediums that satisfy the desired values of both the bit error rate and the linearity.

The evaluation of the bit error rate and the evaluation of the linearity are performed independently of each other. By examining the relationships between the bit error rate and the linearity, the reason for poor signal quality can be easily identified. This enables easy parameter adjustment of recording waveforms, which adjustment is made within a recording waveform generator (not shown).

When the second evaluation value of the third embodiment is less than 12, this means that there will be a large number of discrimination errors even if error correction processing (not shown) is executed later. Therefore, the second evaluation value should be equal to 12 or more to avoid such errors when information recording mediums are selected.

Where consideration is made of factors that deteriorate the performance of a recording/reproducing system, such as focusing errors and optical aberration, the second evaluation value should be at least 15. Therefore, the second evaluation value should be equal to 15 or more to avoid such adverse factors when information recording mediums are selected.

An information recording medium that does not satisfy both the first and second evaluation values has problems in that there may be a large number of discrimination errors even if error correction processing (not shown) is executed later. When information recording mediums are selected, therefore, the first evaluation value should be not more than $1\times10^{-3}$ and the second evaluation value should be not less than 12.

Where consideration is made of factors that deteriorate the performance of a recording/reproducing system, such as focusing errors and optical aberration, the first evaluation value should be not more than $5\times10^{-5}$ and the second evaluation value should be not less than 15. The first and second evaluation values are determined in these ranges when information recording mediums are selected.

Embodiment 4

FIG. 7 shows the fourth embodiment of the present invention. In FIG. 7, the same reference numerals as used in FIG. 6 represent similar or corresponding structural elements. In the recording system shown in FIG. 7, an error correction encoder 121 encodes binary user data. A product code is used as an error correction code. In the process of product encoding, the user data is arranged in two dimensions, and the parities of the user data are calculated with respect to the row and column directions. The calculated parities (redundancy bits) are added. The redundancy bits added to the user data in the row direction will be referred to as PI (inner parity), and the redundancy bits added to the user data in the column direction will be referred to as PO (outer parity). The entire user bits arranged in two dimensions will be referred to aqs an ECC block. A modulator 122 performs modification processing in accordance with the (1,7)RLL code. A recording waveform generator 123 generates a recording waveform in accordance with the modified data, and an optical head device 102 records information on an optical disk 101 as marks and spaces.

The information, which is recorded on the optical disk 101 as marks and spaces, is read out by the optical head device (PUH) 102 as feeble analog signals. A preamplifier 103, an analog-digital (AD)converter 104, an equalizer 105, a Viterbi decoder 106, a first evaluation value calculator 107 and a second evaluation value calculator 108 are similar in configuration to those shown in FIG. 6.

The Viterbi decoder 106 decodes equalization signals in accordance with the Viterbi algorithm, thereby obtaining binary identification data. The identification data is supplied to a demodulator 111, by which it is subject to the decoding process based on the Viterbi algorithm. Subsequently, the identification data is supplied to an error correction decoder 112, for error correction, and is then supplied to a succeeding circuit. The identification data is supplied also to first and second evaluation value calculators 107 and 108 as well. The first evaluation calculator 107 has a configuration equivalent to that shown in FIG. 3, and outputs a first evaluation value similar to the evaluation value shown in FIG. 3. The second evaluation value calculator 108 and its second evaluation value are similar to those shown in FIG. 8, 9 or 10.

The error correction decoder 112 arranges the binary data of the demodulator 111 in two dimensions and performs error correction processing using the parities. An error to be corrected by use of "PI" will be referred to as "PI error". The error correction decoder 112 performs error correction processing in units of one ECC block, and outputs a third evaluation value representing the number of PI errors. The number of PI errors is intended to mean the number of rows including at least one PI error (the row is an horizontal array of ECC blocks).

In the present embodiment, the bit error rate is evaluated based on the first evaluation value, the linearity is evaluated based on the second evaluation value, and medium defects are evaluated based on the third evaluation value. Since three kinds of evaluation are thus enabled, it is possible to strictly select optical disks suited for the recording/reproducing of information.

If at least one of the first to third evaluation values fails to satisfy a predetermined value, then the user data of the corresponding information recording medium may not be very reliable. When selecting information recording mediums, therefore, the first evaluation value should be not more than $1 \times 10^{-3}$, the second evaluation value should be not less than 12, and the third evaluation value should be not more than 280 for 8 consecutive ECC blocks.

Where consideration is made of factors that deteriorate the performance of a recording/reproducing system, such as focusing errors and optical aberration, the first evaluation value should be not more than $5 \times 10^{-5}$, the second evaluation value should be not less than 15, and the third evaluation value should be not more than 280 for 8 consecutive ECC blocks. The first, second and third evaluation values are determined in these ranges when information recording mediums are selected.

The present invention described above can be summarized as follows:

(1) The present invention relates to a method which is adapted for an information recording/reproducing apparatus using the PRML discrimination method, and which comprises the steps of: detecting matching between discrimination data and a plurality of predetermined bit sequence pairs of different groups; calculating a bit sequence and corresponding two ideal responses when the matching is detected; obtaining Euclidean distances between the two ideal responses and equalization signals; obtaining a difference between the Euclidean distances; obtaining a mean value and a standard deviation with respect to the difference between the Euclidean distances; and calculating a quality evaluation value of a reproduction signal based on the mean value, the standard deviation, an appearance probability of the predetermined bit sequence, and a Hamming distance between the predetermined bit sequence pairs.

(2) The present invention is applicable to an information recording/reproducing apparatus that adjusts recording waveforms by use of a value calculated from the mean value and the standard deviation.

(3) The present invention may be embodied as a method used for selecting information recording mediums on the basis of: (i) a first evaluation value obtained in evaluation method (1) described above; (ii) a target signal calculated based on a predetermined data sequence and a predetermined partial response characteristic; and (iii) a second evaluation value based on the autocorrelation of an equalization error representing a difference in reproduction equalization signals and corresponding to each clock period.

(4) The present invention may be embodied as a method used for selecting information recording mediums on the basis of: (i) the first and second evaluation values used in evaluation method (3) described above; and (ii) a third evaluation value supplied from an error correction decoder and corresponding at least to a medium defect.

(5) The present invention may be realized as an information recording/reproducing apparatus which calculates an evaluation value using any one of signal evaluation methods (1), (3) and (4) described above, and which performs predetermined improvement processing if the calculated evaluation value is worse than a predetermined value.

(6) The present invention relates to an information recording medium wherein the evaluation value described in method (1) described above is not more than $1 \times 10^{-3}$.

(7) The present invention may be embodied as an information recording medium wherein the first evaluation value of method (3) described above is not more than $1 \times 10^{-3}$ and the second evaluation value of method (3) is not less than 12.

(8) The present invention may be embodied as an information recording medium wherein the first evaluation value of method (4) described above is not more than $1 \times 10^{-3}$, the second evaluation value of method (4) described above is not less than 12, and the third evaluation value of method (4) described above is not more than 280 for 8 consecutive ECC consecutive blocks. In the information recording medium, each ECC block is defined as a data block comprised of 182 columns and 208 rows (which is normally used in a DVD medium). If two of such ECC blocks are counted as one ECC, then the third evaluation value of method (4) described above is not more than 280 for 4 ECC blocks.

(9) The present invention may be embodied as an information recording medium wherein the second evaluation value of method (3) described above is not less than 15.

(10) The present invention may be embodied as an information recording medium wherein the evaluation value of method (1) described above is not more than $5 \times 10^{-5}$.

(11) The present invention may be embodied as an information recording medium wherein the first evaluation value of method (3) described above is not more than $5 \times 10^{-5}$ and the second evaluation value of method (3) described above is not less than 15.

(12) The present invention may be embodied as an information recording medium wherein the first evaluation value of method (4) described above is not more than $5 \times 10^{-5}$, the second evaluation value of method (4) described above is not less than 15, and the third evaluation value of method (4) described above is not more than 280 for 8 ECC blocks.

(13) The present invention relates to a signal evaluation method wherein the evaluation value of method (1) described above is calculated by use of equalization signals corresponding to 100,000 channel bits or more.

Furthermore, the present invention may be realized as an information recording/reproducing apparatus which calculates an evaluation value by using one of the signal evaluation methods described above, and which performs at least one of the following if the calculated evaluation value is worse than a predetermined value: adjustment of a recording waveform; an offset adjustment of a reproduction signal; gain adjustment; adjustment of an equalization coefficient; tracking control; focusing control; tilting control; and the adjustment of a spherical aberration. Moreover, the present invention is not limited to a recording/reproducing apparatus; it is applicable to a reproduction apparatus as well.

As described above, the present invention enables accurate evaluation of the quality of reproduction signals reproduced from an optical disk. Since the quality evaluation is based on evaluation signals, the recording or reproducing conditions of an information recording/reproducing apparatus can be optimized.

The following are tables showing examples of data stored in the reference table:

TABLE 1-1

|  | T | F |
|---|---|---|
| Group 1 | 001110000 | 001100000 |
| Group 2 | 011110000 | 011100000 |
| Group 3 | 111110000 | 111100000 |
| Group 4 | 001110001 | 001100001 |
| Group 5 | 011110001 | 011100001 |
| Group 6 | 111110001 | 111100001 |
| Group 7 | 001110011 | 001100011 |
| Group 8 | 011110011 | 011100011 |
| Group 9 | 111110011 | 111100011 |
| Group 10 | 000011100 | 000001100 |
| Group 11 | 000011110 | 000001110 |
| Group 12 | 000011111 | 000001111 |
| Group 13 | 100011100 | 100001100 |
| Group 14 | 100011110 | 100001110 |
| Group 15 | 100011111 | 100001111 |
| Group 16 | 110011100 | 110001100 |
| Group 17 | 110011110 | 110001110 |
| Group 18 | 110011111 | 110001111 |
| Group 19 | 00111001100 | 00110011100 |
| Group 20 | 01111001100 | 01110011100 |
| Group 21 | 11111001100 | 11110011100 |
| Group 22 | 00111001110 | 00110011110 |
| Group 23 | 01111001110 | 01110011110 |
| Group 24 | 11111001110 | 11110011110 |
| Group 25 | 00111001111 | 00110011111 |
| Group 26 | 01111001111 | 01110011111 |
| Group 27 | 11111001111 | 11110011111 |
| Group 28 | 00001100000 | 00000110000 |
| Group 29 | 10001100000 | 10000110000 |
| Group 30 | 11001100000 | 11000110000 |
| Group 31 | 00001100001 | 00000110001 |
| Group 32 | 10001100001 | 10000110001 |
| Group 33 | 11001100001 | 11000110001 |
| Group 34 | 00001100011 | 00000110011 |
| Group 35 | 10001100011 | 10000110011 |
| Group 36 | 11001100011 | 11000110011 |
| Group 37 | 0011100110000 | 0011001100000 |
| Group 38 | 0111100110000 | 0111001100000 |
| Group 39 | 1111100110000 | 1111001100000 |
| Group 40 | 0011100110001 | 0011001100001 |
| Group 41 | 0111100110001 | 0111001100001 |
| Group 42 | 1111100110001 | 1111001100001 |
| Group 43 | 0011100110011 | 0011001100011 |
| Group 44 | 0111100110011 | 0111001100011 |
| Group 45 | 1111100110011 | 1111001100011 |
| Group 46 | 0000110011100 | 0000011001100 |
| Group 47 | 1000110011100 | 1000011001100 |
| Group 48 | 1100110011100 | 1100011001100 |
| Group 49 | 0000110011110 | 0000011001110 |
| Group 50 | 1000110011110 | 1000011001110 |
| Group 51 | 1100110011110 | 1100011001110 |
| Group 52 | 0000110011111 | 0000011001111 |
| Group 53 | 1000110011111 | 1000011001111 |
| Group 54 | 1100110011111 | 1100011001111 |

TABLE 1-2

|  | F | T |
|---|---|---|
| Group 55 | 001110000 | 001100000 |
| Group 56 | 011110000 | 011100000 |
| Group 57 | 111110000 | 111100000 |
| Group 58 | 001110001 | 001100001 |
| Group 59 | 011110001 | 011100001 |
| Group 60 | 111110001 | 111100001 |
| Group 61 | 001110011 | 001100011 |
| Group 62 | 011110011 | 011100011 |
| Group 63 | 111110011 | 111100011 |

TABLE 1-2-continued

|  | F | T |
|---|---|---|
| Group 64 | 000011100 | 000001100 |
| Group 65 | 000011110 | 000001110 |
| Group 66 | 000011111 | 000001111 |
| Group 67 | 100011100 | 100001100 |
| Group 68 | 100011110 | 100001110 |
| Group 69 | 100011111 | 100001111 |
| Group 70 | 110011100 | 110001100 |
| Group 71 | 110011110 | 110001110 |
| Group 72 | 110011111 | 110001111 |
| Group 73 | 00111001100 | 00110011100 |
| Group 74 | 01111001100 | 01110011100 |
| Group 75 | 11111001100 | 11110011100 |
| Group 76 | 00111001110 | 00110011110 |
| Group 77 | 01111001110 | 01110011110 |
| Group 78 | 11111001110 | 11110011110 |
| Group 79 | 00111001111 | 00110011111 |
| Group 80 | 01111001111 | 01110011111 |
| Group 81 | 11111001111 | 11110011111 |
| Group 82 | 00001100000 | 00000110000 |
| Group 83 | 10001100000 | 10000110000 |
| Group 84 | 11001100000 | 11000110000 |
| Group 85 | 00001100001 | 00000110001 |
| Group 86 | 10001100001 | 10000110001 |
| Group 87 | 11001100001 | 1000110001 |
| Group 88 | 00001100011 | 00000110011 |
| Group 89 | 10001100011 | 10000110011 |
| Group 90 | 11001100011 | 11000110011 |
| Group 91 | 0011100110000 | 0011001100000 |
| Group 92 | 0111100110000 | 0111001100000 |
| Group 93 | 1111100110000 | 1111001100000 |
| Group 94 | 0011100110001 | 0011001100001 |
| Group 95 | 0111100110001 | 0111001100001 |
| Group 96 | 1111100110001 | 1111001100001 |
| Group 97 | 0011100110011 | 0011001100011 |
| Group 98 | 0111100110011 | 0111001100011 |
| Group 99 | 1111100110011 | 1111001100011 |
| Group 100 | 0000110011100 | 0000011001100 |
| Group 101 | 1000110011100 | 1000011001100 |
| Group 102 | 1100110011100 | 1100011001100 |
| Group 103 | 0000110011110 | 0000011001110 |
| Group 104 | 1000110011110 | 1000011001110 |
| Group 105 | 1100110011110 | 1100011001110 |
| Group 106 | 0000110011111 | 0000011001111 |
| Group 107 | 1000110011111 | 1000011001111 |
| Group 108 | 1100110011111 | 1100011001111 |

TABLE 2-1

|  | T | F |
|---|---|---|
| Group 1 | 001110000 | 001100000 |
| Group 2 | 011110000 | 011100000 |
| Group 3 | 111110000 | 111100000 |
| Group 1 | 001110001 | 001100001 |
| Group 2 | 011110001 | 011100001 |
| Group 3 | 111110001 | 111100001 |
| Group 1 | 001110011 | 001100011 |
| Group 2 | 011110011 | 011100011 |
| Group 3 | 111110011 | 111100011 |
| Group 4 | 000011100 | 000001100 |
| Group 5 | 000011110 | 000001110 |
| Group 6 | 000011111 | 000001111 |
| Group 4 | 100011100 | 100001100 |
| Group 5 | 100011110 | 100001110 |
| Group 6 | 100011111 | 100001111 |
| Group 4 | 110011100 | 110001100 |
| Group 5 | 110011110 | 110001110 |
| Group 6 | 110011111 | 110001111 |
| Group 13 | 00111001100 | 00110011100 |
| Group 13 | 01111001100 | 01110011100 |
| Group 13 | 11111001100 | 11110011100 |
| Group 13 | 00111001110 | 00110011110 |
| Group 13 | 01111001110 | 01110011110 |
| Group 13 | 11111001110 | 11110011110 |

TABLE 2-1-continued

| | T | F |
|---|---|---|
| Group 13 | 00111001111 | 00110011111 |
| Group 13 | 01111001111 | 01110011111 |
| Group 13 | 11111001111 | 11110011111 |
| Group 14 | 00001100000 | 00000110000 |
| Group 14 | 10001100000 | 10000110000 |
| Group 14 | 11001100000 | 11000110000 |
| Group 14 | 00001100001 | 00000110001 |
| Group 14 | 10001100001 | 10000110001 |
| Group 14 | 11001100001 | 11000110001 |
| Group 14 | 00001100011 | 00000110011 |
| Group 14 | 10001100011 | 10000110011 |
| Group 14 | 11001100011 | 11000110011 |
| Group 1 | 0011100110000 | 0011001100000 |
| Group 2 | 0111100110000 | 0111001100000 |
| Group 3 | 1111100110000 | 1111001100000 |
| Group 1 | 0011100110001 | 0011001100001 |
| Group 2 | 0111100110001 | 0111001100001 |
| Group 3 | 1111100110001 | 1111001100001 |
| Group 1 | 0011100110011 | 0011001100011 |
| Group 2 | 0111100110011 | 0111001100011 |
| Group 3 | 1111100110011 | 1111001100011 |
| Group 4 | 0000110011100 | 0000011001100 |
| Group 5 | 1000110011100 | 1000011001100 |
| Group 6 | 1100110011100 | 1100011001100 |
| Group 4 | 0000110011110 | 0000011001110 |
| Group 5 | 1000110011110 | 1000011001110 |
| Group 6 | 1100110011110 | 1100011001110 |
| Group 4 | 0000110011111 | 0000011001111 |
| Group 5 | 1000110011111 | 1000011001111 |
| Group 6 | 1100110011111 | 1100011001111 |

TABLE 2-2

| | F | T |
|---|---|---|
| Group 7 | 001110000 | 001100000 |
| Group 8 | 011110000 | 011100000 |
| Group 9 | 111110000 | 111100000 |
| Group 7 | 001110001 | 001100001 |
| Group 8 | 011110001 | 011100001 |
| Group 9 | 111110001 | 111100001 |
| Group 7 | 001110011 | 001100011 |
| Group 8 | 011110011 | 011100011 |
| Group 9 | 111110011 | 111100011 |
| Group 10 | 000011100 | 000001100 |
| Group 11 | 000011110 | 000001110 |
| Group 12 | 000011111 | 000001111 |
| Group 10 | 100011100 | 100001100 |
| Group 11 | 100011110 | 100001110 |
| Group 12 | 100011111 | 100001111 |
| Group 10 | 110011100 | 110001100 |
| Group 11 | 110011110 | 110001110 |
| Group 12 | 110011111 | 110001111 |
| Group 15 | 00111001100 | 00110011100 |
| Group 15 | 01111001100 | 01110011100 |
| Group 15 | 11111001100 | 11110011100 |
| Group 15 | 00111001110 | 00110011110 |
| Group 15 | 01111001110 | 01110011110 |
| Group 15 | 11111001110 | 11110011110 |
| Group 15 | 00111001111 | 00110011111 |
| Group 15 | 01111001111 | 01110011111 |
| Group 15 | 11111001111 | 11110011111 |
| Group 16 | 00001100000 | 00000110000 |
| Group 16 | 10001100000 | 10000110000 |
| Group 16 | 11001100000 | 11000110000 |
| Group 16 | 00001100001 | 00000110001 |
| Group 16 | 10001100001 | 10000110001 |
| Group 16 | 11001100001 | 11000110001 |
| Group 16 | 00001100011 | 00000110011 |
| Group 16 | 10001100011 | 10000110011 |
| Group 16 | 11001100011 | 11000110011 |
| Group 7 | 0011100110000 | 0011001100000 |
| Group 8 | 0111100110000 | 0111001100000 |
| Group 9 | 1111100110000 | 1111001100000 |

TABLE 2-2-continued

| | F | T |
|---|---|---|
| Group 7 | 0011100110001 | 0011001100001 |
| Group 8 | 0111100110001 | 0111001100001 |
| Group 9 | 1111100110001 | 1111001100001 |
| Group 7 | 0011100110011 | 0011001100011 |
| Group 8 | 0111100110011 | 0111001100011 |
| Group 9 | 1111100110011 | 1111001100011 |
| Group 10 | 0000110011100 | 0000011001100 |
| Group 11 | 1000110011100 | 1000011001100 |
| Group 12 | 1100110011100 | 1100011001100 |
| Group 10 | 0000110011110 | 0000011001110 |
| Group 11 | 1000110011110 | 1000011001110 |
| Group 12 | 1100110011110 | 1100011001110 |
| Group 10 | 0000110011111 | 0000011001111 |
| Group 11 | 1000110011111 | 1000011001111 |
| Group 12 | 1100110011111 | 1100011001111 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal evaluation method configured to evaluate a reproduction equalization signal reproduced from a recording medium by use of a PRML (partial response and maximum likelihood) discrimination method, said method comprising the steps of:
    detecting matching between discrimination data and a plurality of predetermined bit pattern pairs of different groups;
    calculating a bit pattern and corresponding two ideal responses when the matching is detected;
    obtaining Euclidean distances between the two ideal responses and equalization reproduced signals;
    obtaining a difference between the Euclidean distances;
    obtaining a mean value and a standard deviation with respect to the difference between the Euclidean distances;
    calculating a miss-discrimination probability F(0) of the predetermined bit pattern from the mean value and the standard deviation; and
    calculating a quality evaluation value of a reproduction signal based on the miss-discrimination probability F(0), an appearance probability of the predetermined bit pattern, and a Hamming distance between the predetermined bit pattern pairs.

2. A signal evaluation method according to claim 1, wherein said quality evaluation signal is used as a first evaluation value, a target signal is calculated based on a predetermined data sequence and a predetermined partial response characteristic, an equalization error representing a difference in reproduction equalization signals is calculated in each clock period, a second evaluation value based on the autocorrelation of said equalization error is used as an evaluation value for evaluating the signal quality, and said first evaluation value and said second evaluation value are used in combination to obtain final evaluation.

3. A signal evaluation method according to claim 2, wherein the final evaluation is made based on the first evaluation value, the second evaluation value, and a third evaluation value, the third evaluation value being provided by an error correction decoder and attributable mainly to a medium defect.

4. A signal evaluation method according to claim 1, wherein said quality evaluation value is used as a first evaluation value, and the final evaluation is made based on the first evaluation value and a second evaluation value, the second evaluation value being provided by an error correction decoder and attributable mainly to a medium defect.

5. A signal evaluation method according to any one of claims 1, 2, 3 and 4, wherein the evaluation value is calculated by use of equalization signals corresponding to 100,000 channel bits or more.

6. An apparatus used as one of an information recording/reproducing apparatus and an information reproducing apparatus and outputting reproduction signals reproduced from a recording medium by use of a PRML (partial response and maximum likelihood) discrimination method, said apparatus comprising signal reproduction evaluation means including:
   means for detecting matching between discrimination data and a plurality of predetermined bit pattern pairs of different groups;
   means for calculating a bit pattern and corresponding two ideal responses when the matching is detected;
   means for obtaining Euclidean distances between the two ideal responses and equalization reproduced signals;
   means for obtaining a difference between the Euclidean distances;
   means for obtaining a mean value and a standard deviation with respect to the difference between the Euclidean distances;
   means for calculating a miss-discrimination probability $F(0)$ of the predetermined bit pattern from the mean value and the standard deviation; and
   means for calculating a quality evaluation value of a reproduction signal based on the miss-discrimination probability $F(0)$, an appearance probability of the predetermined bit pattern, and a Hamming distance between the predetermined bit pattern pairs.

7. An apparatus according to claim 6, further comprising:
   means for adjusting a recording waveform by use of a value calculated based on the mean value and the standard deviation.

8. An apparatus used as one of an information recording/reproducing apparatus and an information reproducing apparatus and configured to produce an evaluation value by use of a signal evaluation method described in any one of claims 1, 2, 3, and 4, said apparatus comprising means for performing at least one of: adjustment of a recording waveform; an offset adjustment of a reproduction signal; gain adjustment; adjustment of an equalization coefficient; tracking control; focusing control; tilting control; and the adjustment of a spherical aberration.

9. An apparatus according to any one of claims 6 and 7, wherein the evaluation value is calculated by use of equalization signals corresponding to 100,000 channel bits or more.

10. An information recording medium from which reproduction signals are reproduced by use of a PRML (partial response and maximum likelihood) discrimination method, the reproduction signals being evaluated based on an evaluation value obtained by:
   detecting matching between discrimination data and a plurality of predetermined bit pattern pairs of different groups;
   calculating a bit pattern and corresponding two ideal responses when the matching is detected;
   obtaining Euclidean distances between the two ideal responses and equalization reproduced signals;
   obtaining a difference between the Euclidean distances;
   obtaining a mean value and a standard deviation with respect to the difference between the Euclidean distances;
   calculating a miss-discrimination probability $F(0)$ of the predetermined bit pattern from the mean value and the standard deviation; and
   calculating a quality evaluation value of a reproduction signal based on the miss-discrimination probability $F(0)$, an appearance probability of the predetermined bit pattern, and a Hamming distance between the predetermined bit pattern pairs,
   said information recording medium satisfying a requirement that the evaluation value is not more than $1 \times 10^{-3}$.

11. An information recording medium according to claim 10, wherein said quality evaluation signal is used as a first evaluation value, a target signal is calculated based on a predetermined data sequence and a predetermined partial response characteristic, an equalization error representing a difference in reproduction equalization signals is calculated in each clock period, a second evaluation value based on the autocorrelation of the equalization error is used as an evaluation value for evaluating the signal quality, and said first evaluation value and said second evaluation value are used in combination to obtain final evaluation,
   said information recording medium satisfying a requirement that the first evaluation value is not more than $1 \times 10^{-3}$ and the second evaluation value is not less than 12.

12. A recording information medium according to claim 11, wherein the final evaluation is made based on the first evaluation value, the second evaluation value and a third evaluation value, the third evaluation value being provided by an error correction decoder, which performs error correction with respect to the reproduction signals, and attributable mainly to a medium defect,
   said information recording medium satisfying a requirement that the first evaluation value is not more than $1 \times 10^{-3}$, the second evaluation value is not less than 12, and the third evaluation value is not more than 280 for 8 ECC consecutive blocks.

13. An information recording medium according to claim 10, wherein said quality evaluation signal is used as a first evaluation value, a target signal is calculated based on a predetermined data sequence and a predetermined partial response characteristic, an equalization error representing a difference in reproduction equalization signals is calculated in each clock period, a second evaluation value based on the autocorrelation of the equalization error is used as an evaluation value for evaluating the signal quality, and said first evaluation value and said second evaluation value are used in combination to obtain final evaluation,
   said information recording medium satisfying a requirement that the second evaluation value is not less than 15.

14. An information recording medium from which reproduction signals are reproduced by use of a PRML (partial response and maximum likelihood) discrimination method, the reproduction signals being evaluated based on an evaluation value obtained by:
   detecting matching between discrimination data and a plurality of predetermined bit pattern pairs of different groups;
   calculating a bit pattern and corresponding two ideal responses when the matching is detected;

obtaining Euclidean distances between the two ideal responses and equalization reproduced signals;

obtaining a difference between the Euclidean distances;

obtaining a mean value and a standard deviation with respect to the difference between the Euclidean distances;

calculating a miss-discrimination probability F(0) of the predetermined bit pattern from the mean value and the standard deviation; and calculating a quality evaluation value of a reproduction signal based on the miss-discrimination probability F(0), an appearance probability of the predetermined bit pattern, and a Hamming distance between the predetermined bit pattern pairs, said information recording medium satisfying a requirement that the evaluation value is not more than $1\times10^{-5}$.

15. An information recording medium according to claim 14, wherein said quality evaluation signal is used as a first evaluation value, a target signal is calculated based on a predetermined data sequence and a predetermined partial response characteristic, an equalization error representing a difference in reproduction equalization signals is calculated in each clock period, a second evaluation value based on the autocorrelation of the equalization error is used as an evaluation value for evaluating the signal quality, and said first evaluation value and said second evaluation value are used in combination to obtain final evaluation, said information recording medium satisfying a requirement that the first evaluation value is not more than $1\times10^{-5}$ and the second evaluation value is not less than 15.

16. A recording information medium according to claim 15, wherein the final evaluation is made based on the first evaluation value, the second evaluation value and a third evaluation value, the third evaluation value being provided by an error correction decoder, which performs error correction with respect to the reproduction signals, and attributable mainly to a medium defect, said information recording medium satisfying a requirement that the first evaluation value is not more than $1\times10^{-5}$, the second evaluation value is not less than 15, and the third evaluation value is not more than 280 for 8 consecutive ECC blocks.

* * * * *